US012784298B2

(12) United States Patent
Hamasaki et al.

(10) Patent No.: US 12,784,298 B2
(45) Date of Patent: Nov. 3, 2026

(54) IMAGE PROCESSING METHOD, IMAGE PROCESSING DEVICE, AND RECORDING MEDIUM

(71) Applicant: Panasonic Intellectual Property Management Co., Ltd., Osaka (JP)

(72) Inventors: Takeshi Hamasaki, Osaka (JP); Yoshimitsu Asai, Osaka (JP); Toshiyuki Nakashima, Nara (JP); Yoshio Ohtsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 213 days.

(21) Appl. No.: 18/834,324

(22) PCT Filed: Nov. 13, 2023

(86) PCT No.: PCT/JP2023/040799
§ 371 (c)(1),
(2) Date: Jul. 30, 2024

(87) PCT Pub. No.: WO2024/106391
PCT Pub. Date: May 23, 2024

(65) Prior Publication Data
US 2025/0117982 A1 Apr. 10, 2025

(30) Foreign Application Priority Data
Nov. 17, 2022 (JP) ................................ 2022-183836

(51) Int. Cl.
*G06T 11/00* (2026.01)
*G06T 7/73* (2017.01)
(Continued)

(52) U.S. Cl.
CPC ................ *G06T 11/10* (2026.01); *G06T 7/73* (2017.01); *G06T 7/90* (2017.01);
(Continued)

(58) Field of Classification Search
None
See application file for complete search history.

(56) References Cited

U.S. PATENT DOCUMENTS 6,002,424 A * 12/1999 Rapa ..................... H04N 7/183
348/66
2003/0228553 A1* 12/2003 Mandelkern ......... A61B 1/0676
433/29
(Continued)

FOREIGN PATENT DOCUMENTS

JP 2005-000652 A 1/2005
JP 2005-064853 A 3/2005
(Continued)

OTHER PUBLICATIONS

International Search Report (with English translation) and Written Opinion issued on Feb. 6, 2024 in International (PCT) Application No. PCT/JP2023/040799, 14 pages.
(Continued)

*Primary Examiner* — Leon Flores
(74) *Attorney, Agent, or Firm* — Rimon P.C.

(57) ABSTRACT

An image processing method includes: obtaining a first RGB image generated by capturing an image of a tooth and dental plaque that are fluorescing in response to exposure to light including a blue-light wavelength range; and generating a second RGB image by performing, for the first RGB image, image processing including first image processing. In the first image processing, the gains of at least two color components among the red component, the green component, and the blue component of an RGB image to be processed are adjusted so as to equalize the first red pixel average value of red pixel values, the first green pixel average value of green pixel values, and the first blue pixel average value of blue pixel values, the red pixel values, the
(Continued)

green pixel values, and the blue pixel values being the pixel values of first pixels corresponding to the tooth.

14 Claims, 14 Drawing Sheets

(51) Int. Cl.
*G06T 7/90* (2017.01)
*G06T 11/10* (2026.01)
(52) U.S. Cl.
CPC ............... *G06T 2207/10024* (2013.01); *G06T 2207/10064* (2013.01); *G06T 2207/30036* (2013.01)

(56) References Cited

U.S. PATENT DOCUMENTS

| | | | | |
|---|---|---|---|---|
| 2004/0252303 | A1* | 12/2004 | Giorgianni .............. | G01J 3/508 356/402 |
| 2008/0017787 | A1 | 1/2008 | Okawa et al. | |
| 2009/0092297 | A1 | 4/2009 | Kitoh et al. | |
| 2014/0199651 | A1 | 7/2014 | Adachi | |
| 2018/0028063 | A1 | 2/2018 | Elbaz et al. | |
| 2020/0022582 | A1 | 1/2020 | Cheng et al. | |
| 2021/0019885 | A1 | 1/2021 | Jeanne et al. | |
| 2022/0211259 | A1 | 7/2022 | Kuramoto | |

FOREIGN PATENT DOCUMENTS

| | | | |
|---|---|---|---|
| JP | 2008-160519 | A | 7/2008 |
| JP | 2009-100252 | A | 5/2009 |
| JP | 2010-219573 | A | 9/2010 |
| JP | 4576377 | B2 | 11/2010 |
| JP | 2013-042906 | A | 3/2013 |
| JP | 2014-133029 | A | 7/2014 |
| JP | 2019-107239 | A | 7/2019 |
| JP | 2019-141582 | A | 8/2019 |
| JP | 2021-511160 | A | 5/2021 |
| JP | 2021-519180 | A | 8/2021 |
| WO | 2007/010749 | A1 | 1/2007 |
| WO | 2010/095488 | A1 | 8/2010 |
| WO | 2019/147984 | A1 | 8/2019 |
| WO | 2019/192862 | A1 | 10/2019 |
| WO | 2021/060158 | A1 | 4/2021 |

OTHER PUBLICATIONS

Masafumi Inuiya, "Fundamentals of Digital Photography 3, Signal Processing Technology for Digital Still Camera (I)", Journal of the Society of Photographic Science and Technology of Japan, vol. 72, No. 5, 2009, pp. 360-365, with its partial English translation.

Tokuji Hasegawa, "Possibility of Light-induced Fluorescence Application for the Clinical Diagnosis and Treatment of Dentin Caries", Dental Medicine Research, vol. 33, No. 3, 2013, pp. 259-264, with its partial English translation.

* cited by examiner

IMAGE PROCESSING METHOD, IMAGE PROCESSING DEVICE, AND RECORDING MEDIUM

CROSS-REFERENCE TO RELATED APPLICATIONS

This application is the U.S. National Phase under 35 U.S.C. § 371 of International Application No. PCT/JP2023/040799, filed on Nov. 13, 2023, which claims the benefit of foreign priority to Japan Patent Application No. 2022-183836 filed on Nov. 17, 2022, the entire contents of each of which are hereby incorporated by reference.

TECHNICAL FIELD

The present disclosure relates to an image processing method, an image processing device, and a recording medium.

BACKGROUND ART

Patent Literature (PTL) 1 discloses an intraoral camera system for capturing an image of a tooth inside a mouth.

CITATION LIST

Patent Literature

[PTL 1] Japanese Unexamined Patent Application Publication No. 2019-141582

SUMMARY OF INVENTION

Technical Problem

It is required for such an intraoral camera system to readily identify a dental plaque area where dental plaque is formed in a tooth image.

Thus, the present disclosure provides, for example, an image processing method for readily identifying a dental plaque area in a tooth image.

Solution to Problem

An image processing method according to an aspect of the present disclosure includes: obtaining a first RGB image generated by capturing an image of a tooth and dental plaque that are fluorescing in response to exposure to light including a blue-light wavelength range; and generating a second RGB image by performing, for the first RGB image, image processing including first image processing. In the first image processing, a gain for each of at least two color components among the red component, the green component, and the blue component of an RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being the pixel values of a plurality of first pixels making up a portion of the RGB image to be processed that corresponds to the tooth.

It should be noted that these general or specific aspects may be embodied as a system, a device, an integrated circuit, a computer program, or a computer-readable recording medium such as a CD-ROM or may be embodied as any combination of the system, the device, the integrated circuit, the computer program, and the recording medium. In addition, the recording medium may be a non-transitory recording medium.

Advantageous Effects of Invention

By using, for example, an image processing method according to the present disclosure, it is possible to readily identify a dental plaque area in a tooth image.

DESCRIPTION OF EMBODIMENT

Figure 1A:
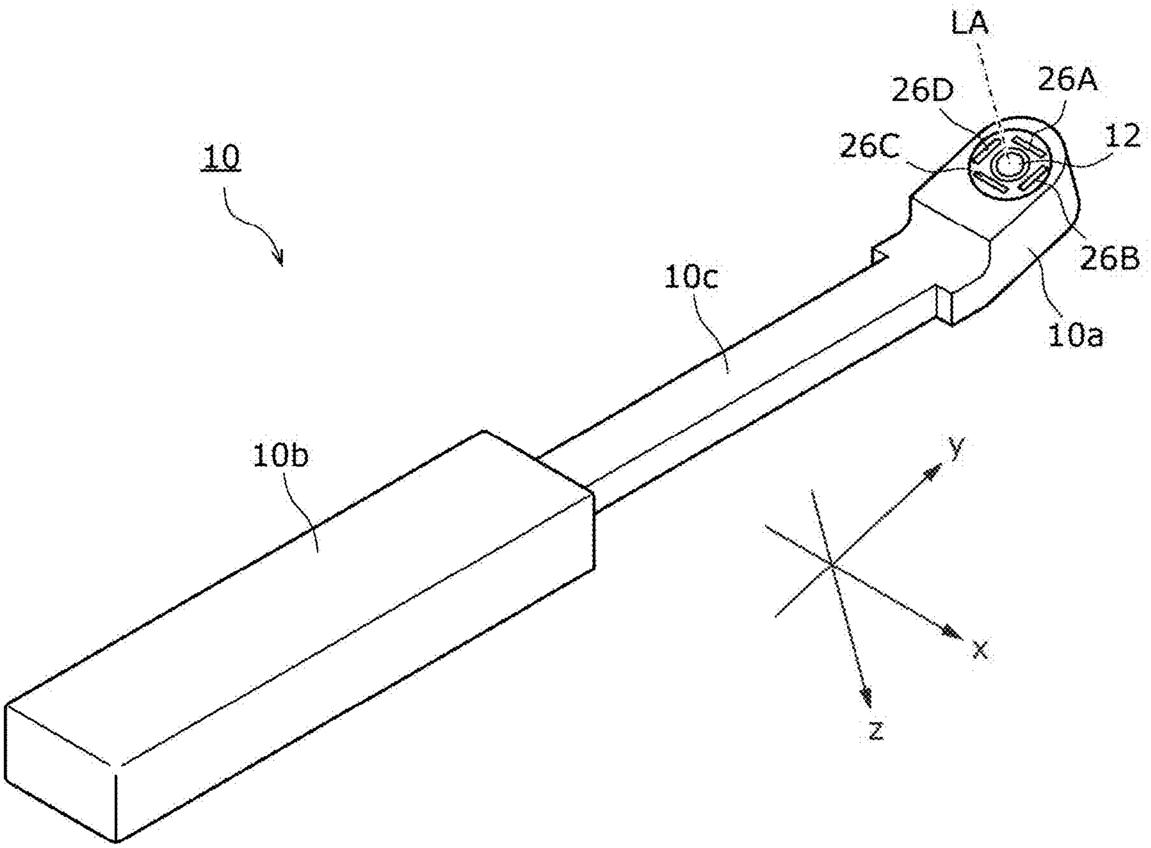
FIG. 1A is a perspective view of the intraoral camera of an intraoral camera system according to an embodiment.

An image processing method according to the first aspect of the present disclosure includes: obtaining a first RGB image generated by capturing an image of a tooth and dental plaque that are fluorescing in response to exposure to light including a blue-light wavelength range; and generating a second RGB image by performing, for the first RGB image, image processing including first image processing. In the first image processing, a gain for each of at least two color components among the red component, the green component, and the blue component of an RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being the pixel values of a plurality of first pixels making up a portion of the RGB image to be processed that corresponds to the tooth.

Thus, by performing the first image processing, it is possible to adjust the white balance of the first RGB image of the fluorescing tooth. In this way, it is possible to generate the second RGB image in which a dental plaque area having dental plaque on the tooth is distinguishable. Thus, it is possible to readily identify dental plaque area in the tooth image. As such, for instance, by capturing an image of a brushed tooth and identifying dental plaque area(s), it is possible to present the insufficient brushing area(s) to the user.

An image processing method according to the second aspect of the present disclosure is the image processing method according to the first aspect. In the first image processing, the gain for each of the at least two color components among the red component, the green component, and the blue component of the RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being the pixel values of a plurality of first pixels making up a portion of the RGB image to be processed that corresponds to a natural tooth.

An image processing method according to the third aspect of the present disclosure, which is the image processing method according to the first aspect or the second aspect, further includes: generating a fourth RGB image by: generating an HSV image by converting the color space of the second RGB image into an HSV space; identifying a specific pixel area in which one or more fourth pixels among a plurality of fourth pixels of the HSV image are located, the one or more fourth pixels satisfying at least one of the following: the saturation is within a first predetermined range, the hue is within a second predetermined range, and the value is within a third predetermined range; and performing saturation enhancement processing for the specific pixel area in the second RGB image.

Thus, the specific pixel area as the dental plaque area is identified from the second RGB image, and the saturation enhancement processing is performed for the specific pixel area, which enables generation of the third RGB image in which the dental plaque area is more distinguishable. Thus, it is possible to readily identify the dental plaque area in the tooth image.

An image processing method according to the fourth aspect of the present disclosure, which is the image processing method according to the first aspect or the second aspect, further includes: generating a fourth RGB image by: generating an HSV image by converting the color space of the second RGB image into an HSV space; identifying a specific pixel area in which one or more fourth pixels among a plurality of fourth pixels of the HSV image are located, the one or more fourth pixels satisfying at least one of the following: the saturation is within a first predetermined range, the hue is within a second predetermined range, and the value is within a third predetermined range; and replacing the specific pixel area in the second RGB image with a predetermined pattern.

Thus, the specific pixel area as the dental plaque area is identified from the second RGB image, and the specific pixel area is replaced with the predetermined pattern, which enables generation of the fourth RGB image in which the dental plaque area is more distinguishable. Thus, it is possible to readily identify the dental plaque area in the tooth image.

An image processing method according to the fifth aspect of the present disclosure is the image processing method according to any one of the first to fourth aspects. The image processing further includes second image processing. In the second image processing, a third RGB image is generated by determining a gain for setting the average value of index values calculated from the second-pixel values of a plurality of second pixels included in an RGB image to be processed, to a predetermined value, and applying the gain determined to the RGB image to be processed. In the first image processing, the third RGB image is processed.

Since the exposure control processing is performed by adjusting the gain for the luminance values of the plurality of second pixels, conditions for the luminance values can be made constant even if there are variations in the image capturing conditions. Since luminance distribution conditions for the third RGB image for which the first image processing is to be performed can be made constant regardless of the image capturing conditions, the first image processing can be performed more effectively.

An image processing according to the sixth aspect of the present disclosure is the image processing method according to the fifth aspect. The average value of the index values is the average value of a color component having the largest average value among the red component, the green component, and the blue component of the first RGB image.

An image processing method according to the seventh aspect of the present disclosure is the image processing method according to the fifth aspect. The index values are obtained based on a red pixel value, a green pixel value, and a blue pixel value included in each of the second-pixel values.

An image processing according to the eighth aspect of the present disclosure is the image processing method according to the fifth aspect. The plurality of second pixels are pixels, among a plurality of third pixels making up the first RGB image, that satisfy both of the following: the largest pixel value among the pixel value of a red component, the pixel value of a green component, and the pixel value of a blue component is lower than a first threshold, and the smallest pixel value among the pixel value of the red component, the pixel value of the green component, and the pixel value of the blue component is lower than or equal to a second threshold.

Thus, the second image processing can be performed for the first RGB image except for the area strongly affected by reflection of illumination light.

An image processing method according to the ninth aspect of the present disclosure, which is the image processing method according to any one of the first to fourth aspects, further includes: detecting the intraoral position that is the position of an intraoral area captured as the first RGB image; and storing the second RGB image in association with the intraoral position.

Thus, it is possible to readily identify the intraoral position of the tooth included in the second RGB image or the fourth RGB image.

An image processing device according to the 10th aspect of the present disclosure includes: an obtainer that obtains a first RGB image generated by capturing an image of a tooth and dental plaque that are fluorescing in response to exposure to light including a blue-light wavelength range; and a generator that generates a second RGB image by performing, for the first RGB image, image processing including first image processing. In the first image processing, a gain for each of at least two color components among the red component, the green component, and the blue component of an RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being the pixel values of a plurality of first pixels making up a portion of the RGB image to be processed that corresponds to the tooth.

Thus, by performing the first image processing, it is possible to adjust the white balance of the first RGB image of the fluorescing tooth. In this way, it is possible to generate the second RGB image in which a dental plaque area having dental plaque on the tooth is distinguishable. Thus, it is possible to readily identify dental plaque area in the tooth image. As such, for instance, by capturing an image of a brushed tooth and identifying dental plaque area(s), it is possible to present the insufficient brushing area(s) to the user.

An image processing device according to the 11th aspect of the present disclosure is the image processing device according to the 10th aspect. In the first image processing, the gain for each of the at least two color components among the red component, the green component, and the blue component of the RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being the pixel values of a plurality of first pixels making up a portion of the RGB image to be processed that corresponds to a natural tooth.

A recording medium according to the 12th aspect of the present disclosure is a non-transitory computer-readable recording medium for causing a computer to execute the image processing method according to any one of the first to ninth aspects.

It should be noted that these general or specific aspects may be embodied as a system, a method, an integrated circuit, a computer program, or a computer-readable recording medium such as a CD-ROM or may be embodied as any combination of the system, the method, the integrated circuit, the computer program, and the recording medium.

An embodiment is described below in detail with reference to the drawings as necessary. However, redundant explanations may be omitted. For instance, detailed explanations for well-known matters and overlapping explanations for substantially the same elements may be omitted. This is to avoid redundant explanations and facilitate understanding by those skilled in the art.

It should be noted that the inventors provide the appended drawings and the explanations below in order to help those skilled in the art to fully understand the present disclosure. Thus, the drawings and the explanations do not intend to limit the subject matter recited in the claims.

Embodiment

FIG. 1A is a perspective view of the intraoral camera of an intraoral camera system according to an embodiment. As illustrated in FIG. 1A, intraoral camera 10 includes a toothbrush-shaped case that can be handled by one hand. The case includes head 10*a*, handle 10*b*, and neck 10*c*. Head 10*a* is put inside the mouth of a user when a dentition image is captured. Handle 10*b* is designed to be held by the user. Neck 10*c* connects head 10*a* and handle 10*b*.

Imaging optical system 12 is incorporated into head 10*a* and neck 10*c*. Imaging optical system 12 includes image sensor 14 and a lens disposed on optical axis LA of thereof.

Figure 1B:
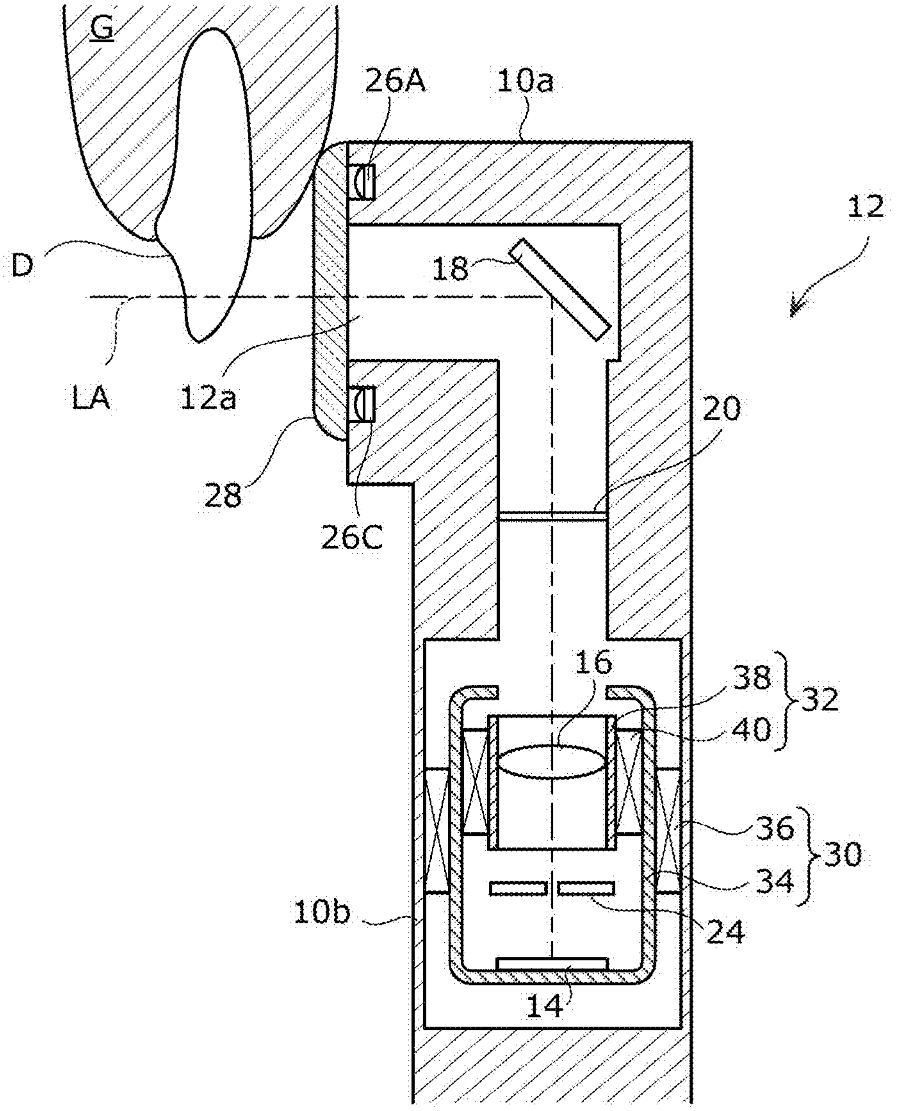
FIG. 1B is a schematic cross-sectional view of an imaging optical system incorporated into the intraoral camera of the intraoral camera system according to the embodiment.

As illustrated in FIG. 1B, in the embodiment, imaging optical system 12 of intraoral camera 10 is incorporated into head 10*a* and neck 10*c*. Imaging optical system 12 includes image sensor 14 and lens 16 disposed on optical axis LA thereof.

Image sensor 14 is an imaging device, such as a CMOS sensor or a CCD, and lens 16 forms an image of tooth D. Image sensor 14 outputs a signal (image data) corresponding to the formed image to an external device.

Lens 16 is, for example, a condenser lens, and when light from tooth D is incident on lens 16, lens 16 forms an image of tooth D onto image sensor 14. It should be noted that lens 16 may be one lens or a lens group made up of a plurality of lenses.

For Embodiment 1, imaging optical system 12 further includes mirror 18, blue-light blocking filter (blue-light blocking element) 20, and aperture 24. Mirror 18 reflects the image of tooth D toward lens 16. Blue-light blocking filter 20 is disposed between mirror 18 and lens 16. Aperture 24 is disposed between lens 16 and image sensor 14.

Mirror 18 is disposed on optical axis LA of imaging optical system 12 so as to reflect the image of tooth D which has passed through light entry port 12*a* of imaging optical system 12 toward lens 16.

Blue-light blocking filter 20 is a filter that blocks the light component of a blue wavelength included in light to be incident on image sensor 14. When teeth are illuminated with light including a blue-light wavelength range to detect dental plaque, as the light including the blue-light wavelength range is intensified to intensify the excitation fluorescence of the dental plaque, the entirety of a first RGB image takes on a blue tinge. In this state, a blue pixel value is dominant over a red pixel value and a green pixel value, which may decrease the effect of making it easier to identify a dental plaque area, which can be obtained by performing image processing (exposure control processing and white balance adjustment processing). To deal with this, blue-light blocking filter 20 blocks, from light yet to enter image sensor 14, a portion of the light including the blue-light wavelength range.

Aperture 24 is a plate-like component having a through hole on optical axis LA of imaging optical system 12 and achieves a deep depth of focus. Thus, a point in the depth direction of an oral cavity can be brought into focus, and a dentition image with a clear outline can be obtained.

In addition, intraoral camera 10 includes first to fourth LEDs 26A to 26D as illumination devices that illuminate target tooth D during image capturing. First to fourth LEDs 26A to 26D are, for example, blue LEDs. In addition, as illustrated in FIG. 1A, for Embodiment 1, first to fourth LEDs 26A to 26D surround light entry port 12*a*. It should be noted that translucent cover 28 covering first to fourth LEDs 26A to 26D and light entry port 12*a* is provided on head 10*a* so as not to run short of illumination light due to, for example, gums G being in contact with first to fourth LEDs 26A to 26D. It should be noted that one or more of first to fourth LEDs 26A to 26D may be one or more white LEDs. By using one or more white LEDs as one or more of first to fourth LEDs 26A to 26D, it is possible to increase the brightness of the first RGB image, which can improve the balance between the blue pixel value and the red pixel value and the balance between the blue pixel value and the green pixel value.

Furthermore, for the embodiment, as illustrated in FIG. 1B, intraoral camera 10 includes composition adjustment mechanism 30 and focus adjustment mechanism 32.

Composition adjustment mechanism 30 includes case 34 holding image sensor 14 and lens 16 and actuator 36 for moving case 34 in the direction in which optical axis LA extends. When actuator 36 adjusts the position of case 34, the angle of view is adjusted, that is, the size of a dentition whose image is to be formed onto image sensor 14 is adjusted. It should be noted that composition adjustment mechanism 30 automatically adjusts the position of case 34 so that the entirety of a tooth is included in a captured image, for example. In addition, in accordance with a user operation, composition adjustment mechanism 30 adjusts the position of case 34 so as to achieve the angle of view desired by the user.

Focus adjustment mechanism 32 is held inside case 34 of composition adjustment mechanism 30, and includes lens holder 38 holding lens 16 and actuator 40 for moving lens holder 38 in the direction in which optical axis LA extends. The focus is adjusted by actuator 40 adjusting the relative position of lens holder 38 relative to image sensor 14. It should be noted that focus adjustment mechanism 32 automatically adjusts the position of lens holder 38 so that a tooth positioned in the middle of an image being captured is brought into focus. In addition, focus adjustment mechanism 32 adjusts the position of lens holder 38 in accordance with a user operation.

It should be noted that the structural elements of imaging optical system 12 except for mirror 18 may be provided in handle 10*b* and neck 10*c* of intraoral camera 10.

Image sensor 14 is an imaging device, such as a CMOS sensor or a CCD, and the lens forms an image of a tooth. Image sensor 14 outputs a signal (image data) corresponding to the formed image to an external device. The image output by image sensor 14 is an RGB image in which each of the pixels of the image includes RGB subpixels.

In addition, intraoral camera 10 includes first to fourth LEDs 26A to 26D as illumination devices that illuminate a target tooth during image capturing. First to fourth LEDs 26A to 26D are, for example, blue LEDs that emit blue light having a wavelength peak of 405 nm. It should be noted that first to fourth LEDs 26A to 26D may be light sources for emitting light including the blue-light wavelength range and are not limited to blue LEDs.

Figure 2:
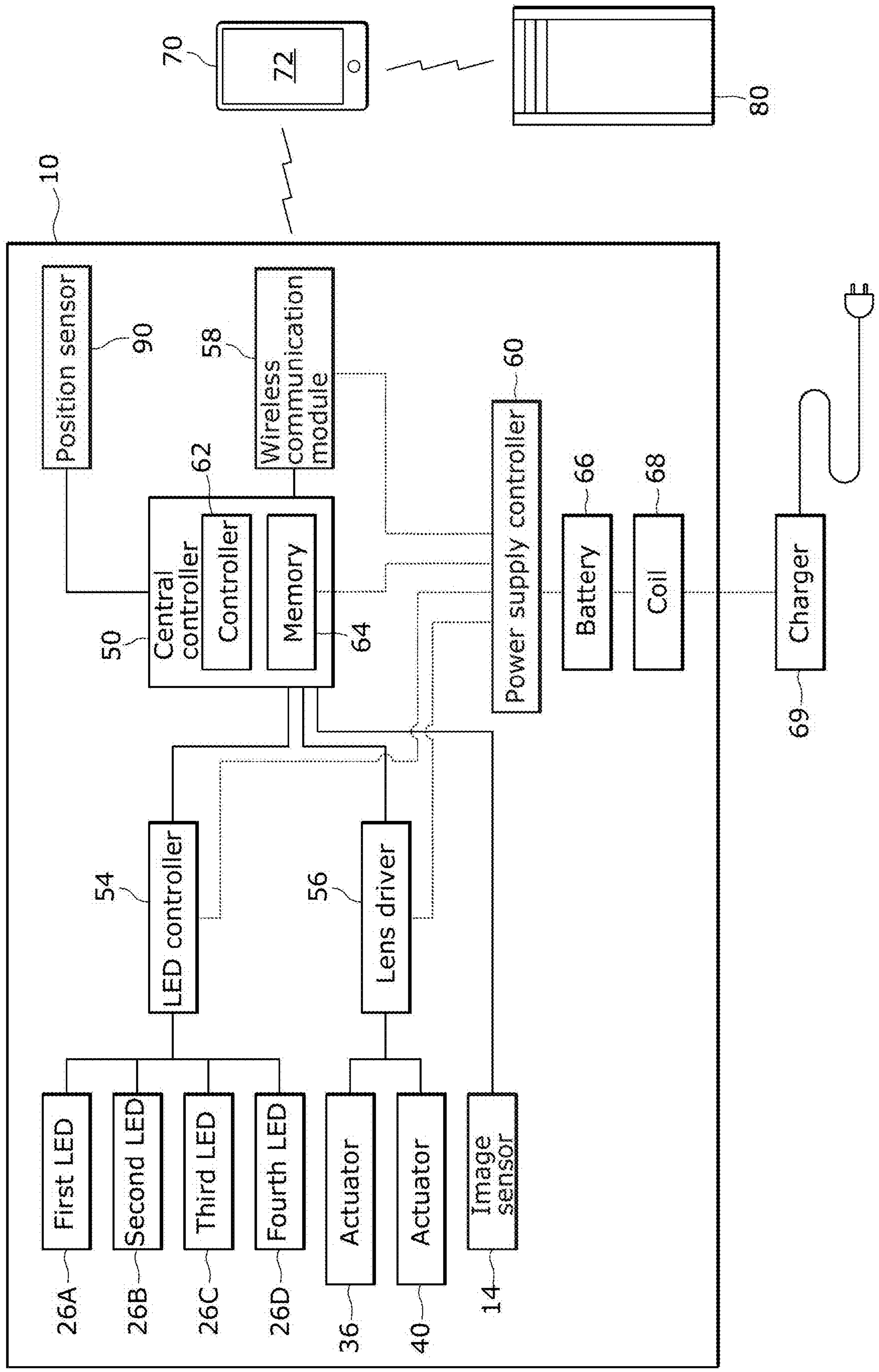
FIG. 2 illustrates a schematic configuration of the intraoral camera system according to the embodiment.

FIG. 2 illustrates a schematic configuration of the intraoral camera system according to the embodiment. As illustrated in FIG. 2, in overview, the intraoral camera system according to the embodiment captures a dentition image by using intraoral camera 10 and performs the image processing for the captured image.

As illustrated in FIG. 2, the intraoral camera system includes intraoral camera 10, portable terminal 70, and cloud server 80. Portable terminal 70 is, for example, a smartphone or a tablet terminal capable of performing wireless communication. Portable terminal 70 includes, as an input device and an output device, touch screen 72 capable of displaying, for example, the dentition image. Portable terminal 70 functions as the user interface of the intraoral camera system.

It should be noted that cloud server 80 is a server capable of communicating with portable terminal 70 via, for example, the internet and provides portable terminal 70 with an application for using intraoral camera 10. For instance, the user downloads the application from cloud server 80 and installs the application on portable terminal 70. In addition, cloud server 80 may obtain, via portable terminal 70, the dentition image captured by intraoral camera 10.

The intraoral camera system includes, as main parts that perform system control, central controller 50, LED controller 54, lens driver 56, and position sensor 90. Here, LED controller 54 controls LEDs 26A to 26D, and lens driver 56 controls actuator 36 of the composition adjustment mechanism and actuator 40 of the focus adjustment mechanism.

In addition, the intraoral camera system includes wireless communication module 58 that performs wireless communication with portable terminal 70 and power supply controller 60 that supplies power to, for example, central controller 50.

Central controller 50 of the intraoral camera system is included in, for example, handle 10*b* of intraoral camera 10. For instance, central controller 50 includes controller 62 such as a CPU or an MPU which performs various processing tasks described later and memory 64 such as RAM and ROM storing program(s) for causing controller 62 to perform the various processing tasks. It should be noted that memory 64 stores, for example, a dentition image (image data) captured by image sensor 14 and various setting data items, in addition to the program(s). The dentition image captured by image sensor 14 is an example of the first RGB image.

Controller 62 transmits the dentition image output by image sensor 14 to portable terminal 70 via wireless communication module 58. Portable terminal 70 displays the transmitted dentition image on touch screen 72 and thus presents the dentition image to the user.

LED controller 54 is included in, for example, handle 10*b* of intraoral camera 10 and switches on and off first to fourth LEDS 26A to 26D in accordance with a control signal from controller 62. LED controller 54 is, for example, a circuit. When for instance the user performs an operation to activate intraoral camera 10 on touch screen 72 of portable terminal 70, a corresponding signal is transmitted from portable terminal 70 to controller 62 via wireless communication module 58. In accordance with the received signal, controller 62 transmits a control signal to LED controller 54 to cause LED controller 54 to switch on first to fourth LEDs 26A to 26D.

Lens driver 56 is included in, for example, handle 10*b* of intraoral camera 10 and controls actuator 36 of the composition adjustment mechanism and actuator 40 of the focus adjustment mechanism in accordance with a control signal from controller 62 of central controller 50. Lens driver 56 is, for example, a circuit. When for instance the user performs an operation related to composition adjustment or focus adjustment on touch screen 72 of portable terminal 70, a corresponding signal is transmitted from portable terminal 70 to central controller 50 via wireless communication module 58. In accordance with the received signal, controller 62 of central controller 50 transmits a control signal to lens driver 56 to cause lens driver 56 to perform the composition adjustment or the focus adjustment. In addition, for instance, in accordance with the dentition image received from image sensor 14, controller 62 calculates the amount of control for actuator 36 or actuator 40 required for the composition adjustment or the focus adjustment. Then, a control signal corresponding to the calculated amount of control is transmitted to lens driver 56.

Wireless communication module 58 is included in, for example, handle 10*b* of intraoral camera 10 and performs wireless communication with portable terminal 70 in accordance with the control signal from controller 62. Wireless communication module 58 performs, with portable terminal 70, wireless communication complying an existing with communication standard, such as Wi-Fi (registered trademark) or Bluetooth (registered trademark). A dentition image showing tooth D is transmitted from intraoral camera 10 to portable terminal 70 via wireless communication module 58, and an operation signal is transmitted from portable terminal 70 to intraoral camera 10 via wireless communication module 58.

For the embodiment, power supply controller 60 is included in handle 10*b* of intraoral camera 10 and distributes the power of battery 66 to central controller 50, LED controller 54, lens driver 56, and wireless communication module 58. Power supply controller 60 is, for example, a circuit. It should be noted that, for the embodiment, battery 66 is a rechargeable (secondary) battery and is wirelessly charged by external charger 69 connected to a commercial power source, via coil 68 included in intraoral camera 10.

Position sensor 90 is a sensor for detecting the orientation and the position of intraoral camera 10 and, for example, a multi-axis (here, x, y, and z-axis, that is, three-axis) acceleration sensor. For instance, position sensor 90 may be a six-axis sensor including a three-axis acceleration sensor and a three-axis gyro sensor. For instance, as illustrated in FIG. 1, the z-axis matches optical axis LA. The y-axis is parallel to the imaging plane and extends in a longitudinal direction of intraoral camera 10. In addition, the x-axis is parallel to the imaging plane and orthogonal to the y-axis. Output by position sensor 90 for each axis may be transmitted to portable terminal 70 via central controller 50 and wireless communication module 58.

A piezo-resistive type, capacitive type, or heat detection type MEMS sensor may be used as position sensor 90. Although not illustrated in the figures, a correction circuit for correcting, for example, the balance of sensor sensitivity between the axes, the temperature characteristics of sensitivity, and temperature drift may be provided. In addition, a bandpass filter (a low pass filter) for removing dynamic acceleration components and noise may be provided. In addition, noise may be reduced by smoothing a waveform output by the acceleration sensor.

Figure 3:
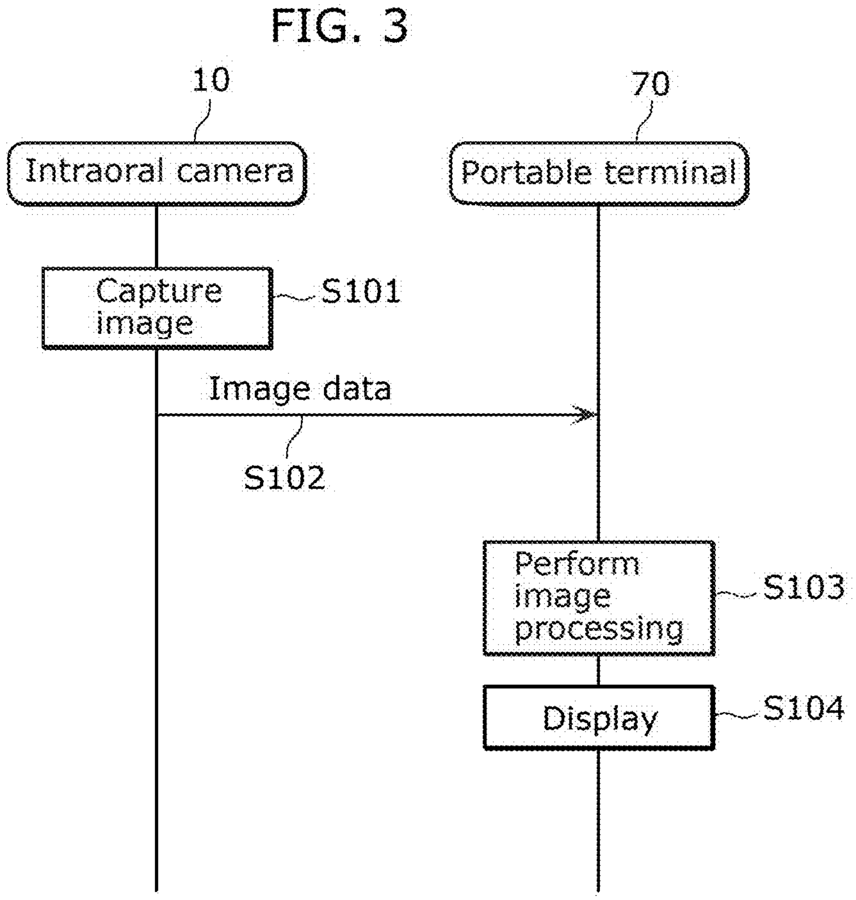
FIG. 3 illustrates a procedure of the intraoral-image capturing operation of the intraoral camera system according to the embodiment.

Then, the intraoral-image capturing operation of the intraoral camera system is described. FIG. 3 illustrates a procedure of the intraoral-image capturing operation of the intraoral camera system. It should be noted that the processing illustrated in FIG. 3 is, for example, processing performed in real time, and is performed for each frame or every time image data including a plurality of frames is obtained.

Image data is generated by the user capturing an image of teeth and gums inside their mouth with intraoral camera 10 (S101). Then, intraoral camera 10 transmits the captured image data to portable terminal 70 (S102). It should be noted that the image data described here may be a video, one still image, or two or more still images. In addition, when the image data is a video or includes two or more still images, sensor data may be transmitted for each frame of the video or each still image. It should be noted that when the image data is a video, sensor data may be transmitted every two or more frames.

In addition, the image data may be transmitted in real time or transmitted at once after a series of image capturing (e.g., after capturing images of all the teeth inside the mouth).

Portable terminal 70 performs the image processing for the received image data (the first RGB image) (S103), and displays the image data which has undergone the image processing (S104).

By using such an intraoral camera system, the user can capture an intraoral image of the user with intraoral camera 10 and check the intraoral condition displayed on portable terminal 70. This enables the user to readily check their teeth's heath condition, for example.

In addition, portable terminal 70 may, for instance, generate the three-dimensional models of teeth inside the mouth from captured image data items. In addition, portable terminal 70 may display an image based on the generated three-dimensional models.

It should be noted that an example in which portable terminal 70 performs the image processing for a tooth image is described here. However, intraoral camera 10 may perform part of the image processing or the whole image processing. Portable terminal 70 is an example of an image processing device.

Figure 4:
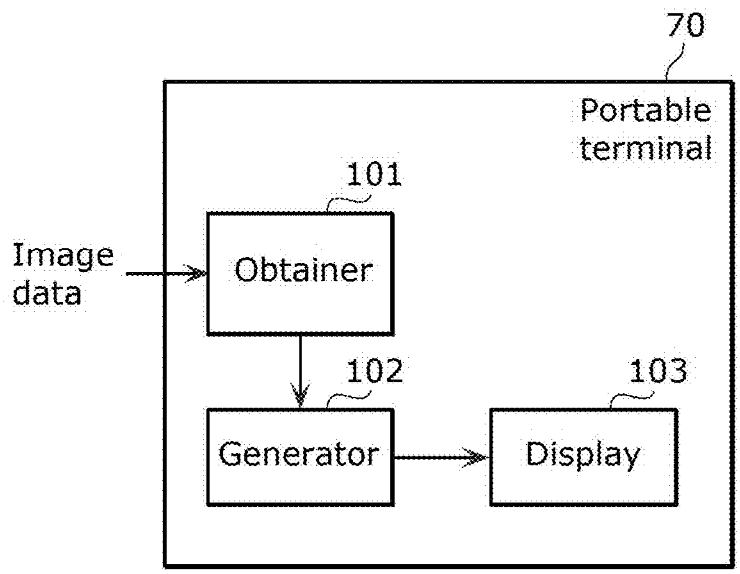
FIG. 4 is a functional block diagram of a portable terminal according to the embodiment.

FIG. 4 is a functional block diagram of portable terminal 70. Portable terminal 70 includes obtainer 101, generator 102, and display 103.

Obtainer 101 obtains the image data (the first RGB image) transmitted from intraoral camera 10. Obtainer 101 may obtain sensor data in addition to the image data from intraoral camera 10. The first RGB image is an image obtained by intraoral camera 10 capturing an image of teeth fluorescing in response to exposure to light including the blue-light wavelength range.

Generator 102 may generate a third RGB image by performing the exposure control processing (second image processing) for the first RGB image, and generate a second RGB image by performing the white balance adjustment processing (first image processing) for the third RGB image.

(Exposure Control Processing)

In the exposure control processing, generator 102 first extracts a plurality of pixels whose RGB values satisfying the following Expressions 1 and 2 from among a plurality of first RGB pixels (third pixels) making up a first RGB image.

$$\min(R, G, B) \leq Ths, \text{ and, } \max(R, G, B) < Thmax \quad \text{(Expression 1)}$$

$$Gmax - G \leq Thb \quad \text{(Expression 2)}$$

The smallest value among the pixel values of the three RGB subpixels of a first RGB pixel (that is, a red pixel value, a green pixel value, and a blue pixel value) is indicated by min(R, G, B).

Ths indicates a threshold for eliminating an area strongly affected by reflection of illumination light (e.g., a glossy area), the area being a portion of the first RGB image. Ths is, for example, 900 in the 10-bit representation.

The largest value among the pixel values of the three RGB subpixels of the first RGB pixel (that is, the red pixel value, the green pixel value, and the blue pixel value) is indicated by max(R, G, B).

Thmax indicates the largest value that the pixel values can take. Thmax is expressed as, for example, 1023 in the 10-bit representation. Thmax is an example of a first threshold.

Gmax indicates the largest value among green pixel values included in the first RGB image. That is, Gmax is the pixel value of a green pixel having the largest pixel value among the green pixels of the plurality of first RGB pixels making up the first RGB image. Thb indicates a threshold for extracting the green pixels of second pixels from among the plurality of first RGB pixels. The image becomes too bright as the value of Thb increases. Thus, for instance, Thb is set to a value lower than or equal to 10 in the 10-bit representation.

The glossy area is eliminated by using Expression 1, and a tooth area in the first RGB image is extracted by using Expression 2. That is, a plurality of pixels extracted by using Expressions 1 and 2 are a plurality of second pixels making up the tooth area. Thus, the plurality of second pixels are pixels, among the plurality of first RGB pixels (the third pixels) making up the first RGB image, that satisfy the following conditions: max(R, G, B), which indicates the largest pixel value among the pixel values of the color components, is lower than a first threshold (Thmax), and min(R, G, B), which indicates the smallest pixel value among the pixel values of the color components, is lower than or equal to a second threshold (Ths).

Generator 102 calculates the average value of the pixel values of the green pixels included in the plurality of second pixels, and determines a gain by which the pixel values of the three RGB subpixels are to be multiplied, according to the calculated average value of the pixel values of the green pixels. For instance, generator 102 determines the gain by which the pixel values of the three RGB subpixels are to be multiplied. The gain is obtained by dividing a target pixel value by the average value of the pixel values of the green pixels. Generator 102 generates a third RGB image by multiplying each of the plurality of first RGB pixels making up the first RGB image by the determined gain. More specifically, generator 102 generates the third RGB image by multiplying the pixel values of the three subpixels of each of the plurality of first RGB pixels by the determined gain. In other words, the pixel values of a plurality of third RGB pixels making up the third RGB image are pixel values obtained by multiplying the pixel values of the plurality of first RGB pixels making up the first RGB image by the determined gain. It should be noted that if a pixel value multiplied by the gain exceeds the largest value (1023 in the case of the 10-bit representation), generator 102 replaces the pixel value with 1023.

In the above explanation, the average value of the pixel values of the green pixels included in the plurality of second pixels extracted from the first RGB pixels by using Expression 2 is calculated, and then the gain by which the pixel values of the three RGB subpixels are to be multiplied is determined according to the calculated average value of the pixel values of the green pixels. However, determination of the gain is not limited to the above example. The average value of the pixel values of red pixels included in the plurality of second pixels extracted from the first RGB pixels may be calculated, and then the gain by which the pixel values of the three RGB subpixels are to be multiplied may be determined according to the calculated average value of the pixel values of the red pixels. Likewise, the average value of the pixel values of blue pixels included in the plurality of second pixels extracted from the first RGB pixels may be calculated, and then the gain by which the pixel values of the three RGB subpixels are to be multiplied may be determined according to the calculated average value of the pixel values of the blue pixels.

Thus, in the exposure control processing, a third RGB image is generated by determining a gain for the second-pixel values of the plurality of second pixels (pixels corresponding to the tooth area) included in an RGB image to be processed (here, the first RGB image) so as to set the average value of index values calculated from the second-pixel values to a predetermined value, and applying the determined gain to the first RGB pixel values of the plurality of first RGB pixels included in the first RGB image. It should be noted that an index value may be a value calculated from the pixel values of three RGB subpixels making up one pixel or may be one of the pixel values of the three RGB subpixels. Here, the average value of the index values is the average value of a color component having the largest pixel value among the red component, the green component, and the blue component of the first RGB image. In addition, the color component having the largest average value is a color component having the largest average value among the following three average values: the first red pixel average value of red pixel values, the first green pixel average value of green pixel values, and the first blue pixel average value of blue pixel values, the red pixel values, the green pixel values, and the blue pixel values being the pixel values of the plurality of first pixels making up the first RGB image. It should be noted that, the first red pixel average value, the first green pixel average value, and the first blue pixel average value need not be calculated or compared when determining the color component having the largest average value, and the color component having the largest average value may be fixed to the green component.

It should be noted that in the above example, in determining the gain, generator 102 calculates the average value of the pixel values of the green pixels included in the plurality of second pixels, and determines the gain according to the calculated average value of the pixel values of the green pixels. However, determination of the gain is not limited to the above example. Generator 102 may calculate the average value of the luminance values of the plurality of second pixels as the average value of the index values, and determine the gain according to the calculated average value of the luminance values. Thus, the index value may be one of the pixel values of three RGB subpixels making up one pixel or may be a value calculated from the pixel values of the three RGB subpixels. Specifically, generator 102 calculates the luminance value of each of the plurality of second pixels, using the subpixel values of the three subpixels of the second pixel. For instance, generator 102 calculates the luminance value by using the following Expression 3.

$$Y = 0.21 * R + 0.72 * G + 0.07 * B \quad \text{(Expression 3)}$$

In Expression 3, Y indicates the luminance value, R indicates the red pixel value, G indicates the green pixel value, and B indicates the blue pixel value.

Thus, luminance values may be obtained based on the red pixel value, the green pixel value, and the blue pixel value included in each of pixel values.

(White Balance Adjustment Processing)

In the white balance adjustment processing, generator 102 extracts, from among the plurality of third RGB pixels making up the third RGB image to be processed, a plurality of pixels whose RGB values satisfying the following Expressions 1 and 4.

$$Thl \leq Y \leq Thu \quad \text{(Expression 4)}$$

In Expression 4, Thl indicates a threshold indicating the lower limit of the tooth area, and Thu indicates a threshold indicating the upper limit of the tooth area.

The tooth area in the third RGB image is extracted by using Expression 4. That is, a plurality of pixels extracted by using Expressions 1 and 4 are the plurality of second pixels making up the tooth area.

Then, generator 102 calculates first red pixel average value Rave that is the average value of the red pixel values in the tooth area satisfying Expressions 1 and 4, first green pixel average value Gave that is the average value of the green pixel values in the tooth area, and first blue pixel average value Bave that is the average value of the blue pixel values in the tooth area. Then, generator 102 adjusts a gain for each of at least two color components among the red component, the green component, and the blue component of an RGB image to be processed, so as to equalize first red pixel average value Rave, first green pixel average value Gave, and first blue pixel average value Bave.

Specifically, generator 102 calculates the gain for the red pixel values (the gain for red pixels) by dividing first green pixel average value Gave by first red pixel average value Rave. In addition, generator 102 calculates the gain for the blue pixel values (the gain for blue pixels) by dividing first green pixel average value Gave by first blue pixel average value Bave. Then, generator 102 generates a second RGB image by multiplying each of the red pixels of the plurality of third RGB pixels making up the third RGB image by the gain for the red pixels and multiplying each of the blue pixels of the plurality of third RGB pixels by the gain for the blue pixels. In other words, the pixel values of a plurality of second RGB pixels making up the second RGB image are pixel values obtained by multiplying the red pixel values of the plurality of third RGB pixels making up the third RGB image by the gain for the red pixels and multiplying the blue pixel values of the plurality of third RGB pixels by the gain for the blue pixels. It should be noted that in the above example, generator 102 adjusts the white balance by calculating the gain for the red pixels and the gain for the blue pixels by using the green pixel average value as a reference and multiplying, by each gain, the pixel values of a color component corresponding to the gain. However, using the green pixel average value as the reference is just an example. The gain for the green pixels and the gain for the blue pixels may be calculated using the red pixel average value as the reference. The gain for the red pixels and the gain for the green pixels may be calculated using the blue pixel average value as the reference.

It should be noted that if a pixel value multiplied by the gain exceeds the largest value (1023 in the case of the 10-bit representation), generator 102 replaces the pixel value with 1023.

In addition, generator 102 may emphasize a dental plaque area within the tooth area in the second RGB image by performing third image processing as described below for the second RGB image. Specifically, generator 102 generates an HSV image by converting the color space of the second RGB image into an HSV space. Then, generator 102 identifies, as the dental plaque area, a specific pixel area in which one or more fourth pixels among a plurality of fourth pixels of the HSV image are located, the one or more fourth pixels satisfying one of the following conditions: the is within saturation a first predetermined range (e.g., at least 30 and at most 80 in the 8-bit representation), the hue is within a second predetermined range (e.g., at least 140 and at most 170 in the 8-bit representation), and the value (brightness) is within a third predetermined range (e.g., at least 100 and at most 180 in the 8-bit representation). It should be noted that the first predetermined range, the second predetermined range, and the third predetermined range may be identified by comparing the actual dental plaque area and tooth area with the HSV image. The predetermined ranges are not limited to the above numerical value ranges. Generator 102 generates the fourth RGB image by performing saturation enhancement processing for the dental plaque area in the second RGB image. It should be noted that generator 102 may generate the fourth RGB image by replacing the dental plaque area with a predetermined pattern instead of performing the saturation enhancement processing. The predetermined pattern may be, for example, graphics having a certain pixel value or graphics having a particular pattern.

Display 103 is the display device of portable terminal 70 and displays the image which has undergone the image processing by generator 102. Display 103 may display the second RGB image or the fourth RGB image.

(Comparison Between Color Difference Data Items on Dental Plaque Area and Tooth Area Detected from First RGB Images Captured Using Various Illumination Beams)

(1) Case where Interior of Mouth is Illuminated with Only Blue Light (Having Peak Wavelength of 405 nm)

Figure 5:
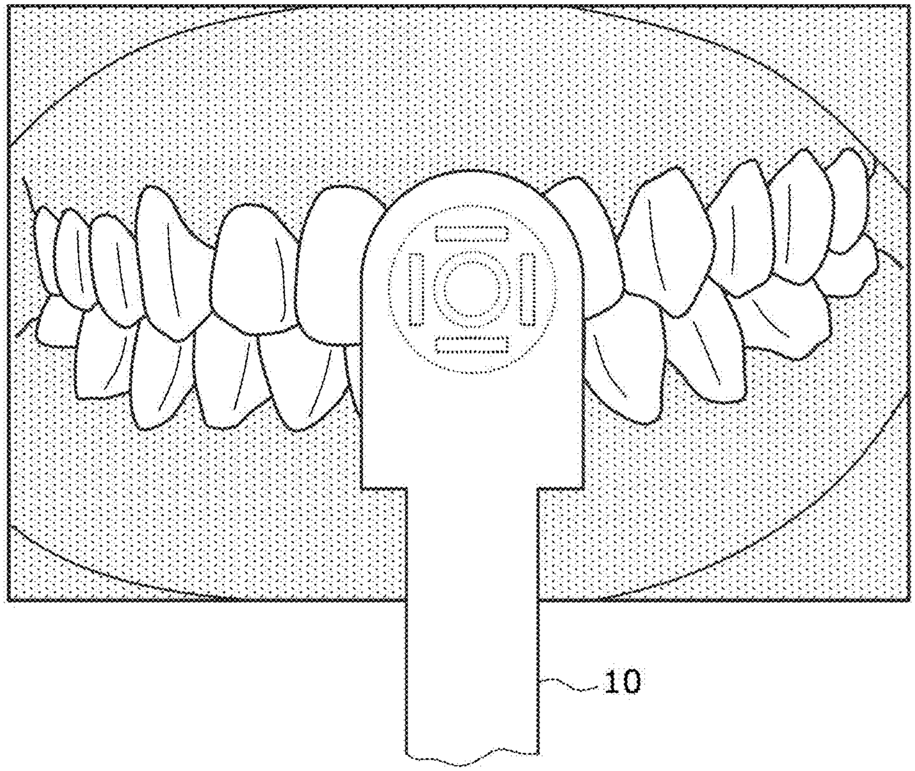
FIG. 5 illustrates a state in which an image of maxillary anterior teeth is being captured from the buccal side (the labial side).
Figure 6A:
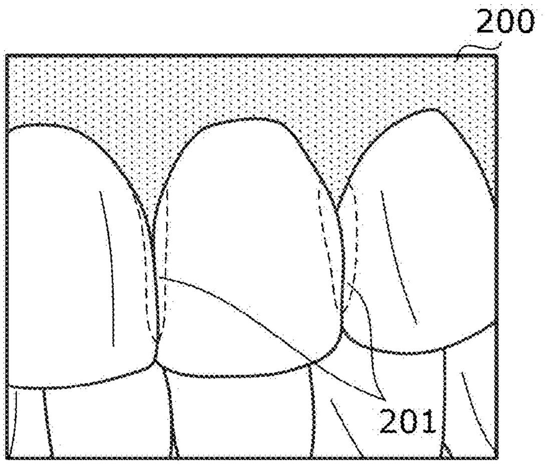
FIG. 6A illustrates an example of a first RGB image of the anterior teeth captured in the state illustrated in FIG. 5.

FIG. 5 illustrates a state in which the user vertically holding intraoral camera 10 is capturing an image of maxillary anterior teeth from the buccal side (the labial side). FIG. 6A illustrates an example of a first RGB image of the anterior teeth captured in the state illustrated in FIG. 5 while illuminating the interior of the mouth with the blue light (having a peak wavelength of 405 nm).

Figure 6B:
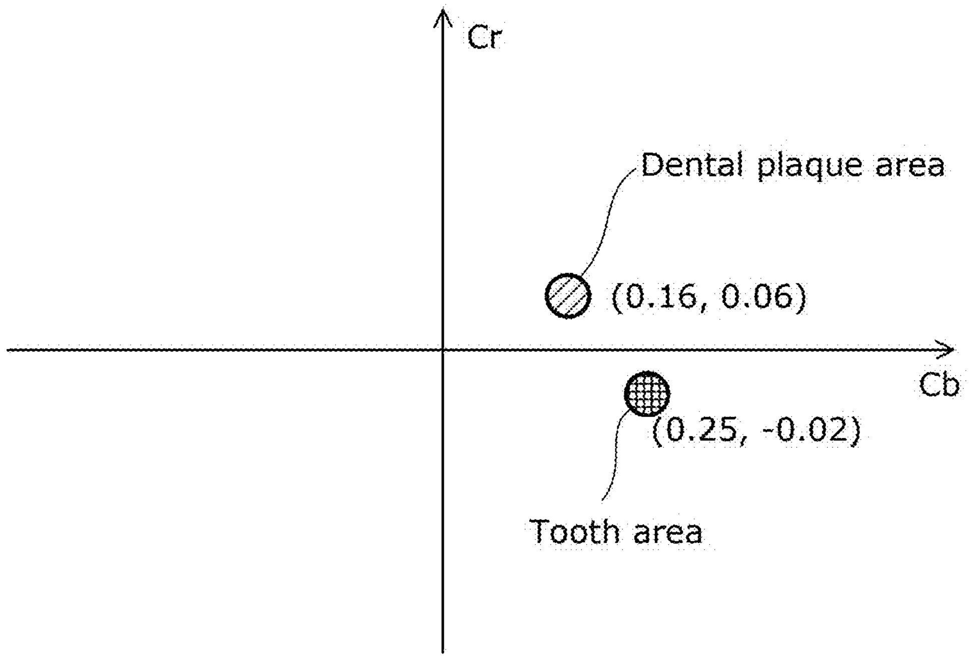
FIG. 6B illustrates an example of color difference data on a dental plaque area and a tooth area in an image captured while illuminating the teeth with light including a blue-light wavelength range without a blue-light blocking filter.

In addition, FIG. 6B illustrates an example of color difference data on dental plaque area 201 and the tooth area detected from the image illustrated in FIG. 6A. It should be noted that FIG. 6B illustrates color difference data on dental plaque area 201 and the tooth area detected from the first RGB image captured without blue-light blocking filter 20 illustrated in FIG. 1B, in order to compare with color difference data on dental plaque area 201 and the tooth area detected from the first RGB image of the anterior teeth captured in the state in which light including the blue-light wavelength range is blocked by a blue-light blocking filter, which is described later. For reference, in FIG. 6B, the color difference average coordinates in hue of the dental plaque area is (0.16, 0.06), whereas the color difference average coordinates in hue of the tooth area is (0.25, −0.02). It should be noted that the above-mentioned color difference average coordinates in hue are reference values and values that can be changed due to the effects of the intensity of the blue light and the sensitivity of the camera.

As known in the quantitative light-induced fluorescence (QLF) method, it is known that bacteria in dental plaque fluoresce a pink tinged with red in response to exposure to the blue light. It is also known that when a tooth is illuminated with light including the blue-light wavelength range, the dentine of the tooth emits excitation fluorescence, which then transmits through an enamel layer and emits green light. Meanwhile, lips and gums take on a blue tinge, which makes it easier to distinguish the teeth and dental plaque from the lips and the gums.

(2) Case where Light Including Blue-Light Wavelength Range is Blocked by Blue-Light Blocking Filter Using a blue-light blocking filter is an effective way of reducing noise. As illustrated in FIG. 1B, blue-light blocking filter 20 can block the light that is a portion of light reflected off a tooth and yet to enter image sensor 14 and that includes the blue-light wavelength range.

Figure 6C:
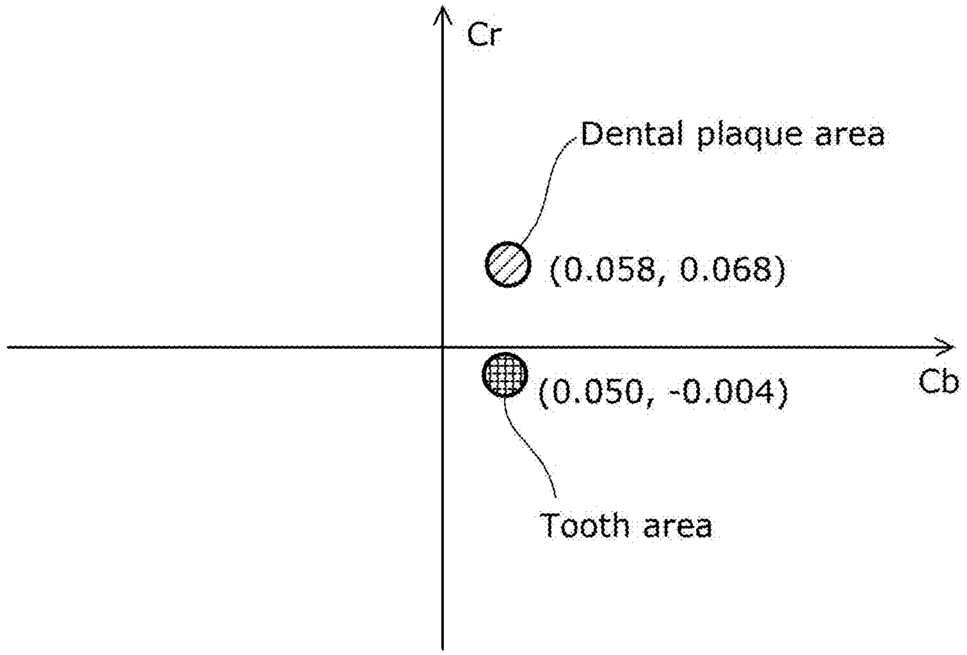
FIG. 6C illustrates an example of color difference data on the dental plaque area and the tooth area in an image captured while illuminating the teeth with the light including the blue-light wavelength range, using a blue-light blocking filter.

FIG. 6C illustrates an example of color difference data on dental plaque area 201 and the tooth area detected from the first RGB image of the anterior teeth captured in the state in which the light including the blue-light wavelength range is blocked by blue-light blocking filter 20. For reference, in FIG. 6C, the color difference average coordinates in hue of the dental plaque area is (0.058, 0.068), whereas the color difference average coordinates in hue of the tooth area is (0.050, −0.004). It should be noted that the above-mentioned color difference average coordinates in hue are reference values and values that can be changed due to the effects of the intensity of the blue light and the sensitivity of the camera.

When comparing FIG. 6C with FIG. 6B, blocking the light including the blue-light wavelength range with the use of the blue-light blocking filter decreases the saturation of blue (that is, the blue becomes paler). Since the dental plaque area fluoresces a pink tinged with red, it is possible to suppress the value (brightness) of the tooth area while maintaining the value (brightness) of the dental plaque area. This decreases the blue pixel value and the differences from the red pixel value and the green pixel value, which can decrease the white balance gains by which the red pixel value and the green pixel are to be multiplied. In this way, noise suppression effects can be obtained.

(3) Case where Interior of Mouth is Illuminated with Blue Light (Having Peak Wavelength of 405 nm) and White Light By adding the white light, it is possible to increase the red pixel value and the green pixel value of the tooth area in the first RGB image and keep the exposure correction gains low, as compared with when the interior of the mouth is illuminated with only the blue light. However, as the intensity of the white light increases, the difference in hue between the dental plaque area and the gums and lips decreases. Thus, an error detection in which the gums and lips are detected as dental plaque is more likely to occur. As such, the ratio of the intensity of the light including the blue-light wavelength range to the intensity of the white light may be optimized in advance to avoid an error detection.

It should be noted that to illuminate the interior of the mouth with the blue light and the white light, one or more of first to fourth LEDs 26A to 26D in FIG. 1 may be one or more white LEDs.

Figure 6D:
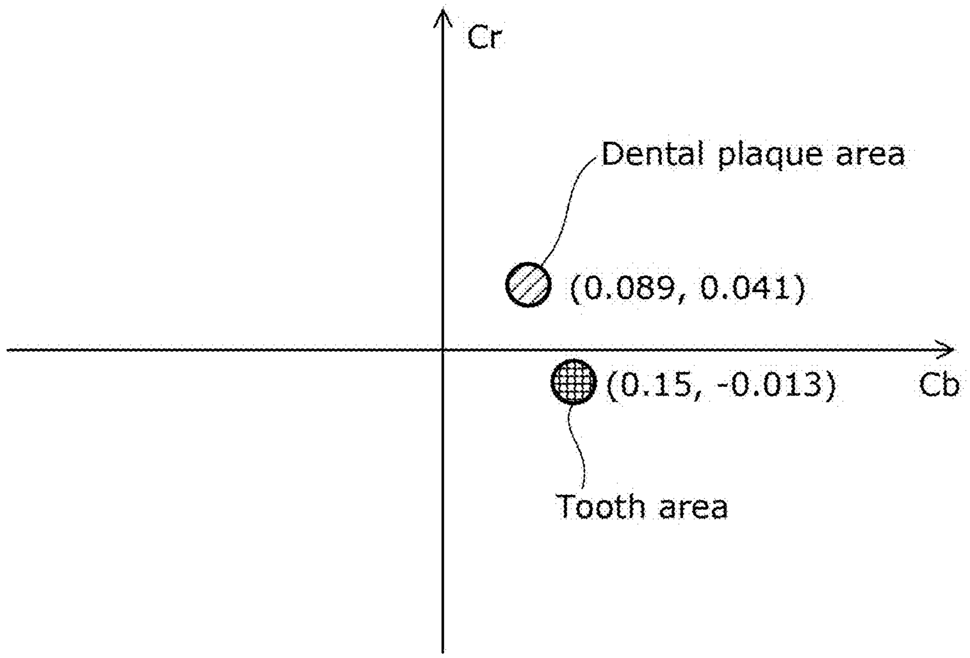
FIG. 6D illustrates an example of color difference data on the dental plaque area and the tooth area in an image captured while illuminating the teeth with the light including the blue-light wavelength range and white light without the blue-light blocking filter.

FIG. 6D illustrates an example of color difference data on dental plaque area 201 and the tooth area detected from the first RGB image of the anterior teeth captured while illuminating the interior of the mouth with the blue light (having a peak wavelength of 405 nm) and the white light. FIG. 6D illustrates color difference data on dental plaque area 201 and the tooth area detected from the first RGB image captured without blue-light blocking filter 20 illustrated in FIG. 1B, in order to compare with the color difference data (FIG. 6C) on dental plaque area 201 and the tooth area detected from the first RGB image of the anterior teeth captured in the state in which the light including the blue-light wavelength range is blocked by the blue-light blocking filter, which is described above. For reference, in FIG. 6D, the color difference average coordinates in hue of the dental plaque area is (0.089, 0.041), whereas the color difference average coordinates in hue of the tooth area is (0.15, −0.013). It should be noted that the above-mentioned color difference average coordinates in hue are reference values and values that can be changed due to the effects of the intensity of each of the blue light and the white light and the sensitivity of the camera.

When comparing FIG. 6D with FIG. 6B, it is understood that the effects of suppressing the value (brightness) of the tooth area tinged with blue while maintaining the value (brightness) of the dental plaque area can be achieved by illuminating the interior of the mouth with the white light in addition to the blue light. This decreases the blue pixel value and the differences from the red pixel value and the green pixel value, which can decrease the white balance gains by which the red pixel value and the green pixel are to be multiplied. In this way, noise suppression effects can be obtained.

(White Balance Processing)

Figure 7A:
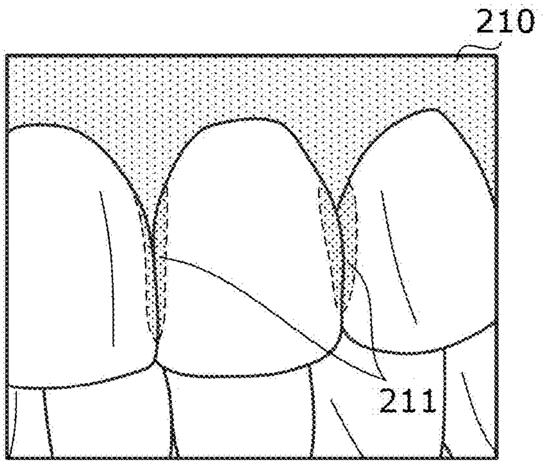
FIG. 7A illustrates an example of a second RGB image of the anterior teeth captured in the state illustrated in FIG. 5.

By performing the image processing (the exposure control processing and the white balance adjustment processing), portable terminal 70 can generate second RGB image 210 in which dental plaque area 211 is distinguishable as illustrated in FIG. 7A. The image processing substantially achromatizes the tooth area, which makes it easier to distinguish dental plaque area 211 from the tooth area.

Figure 7B:
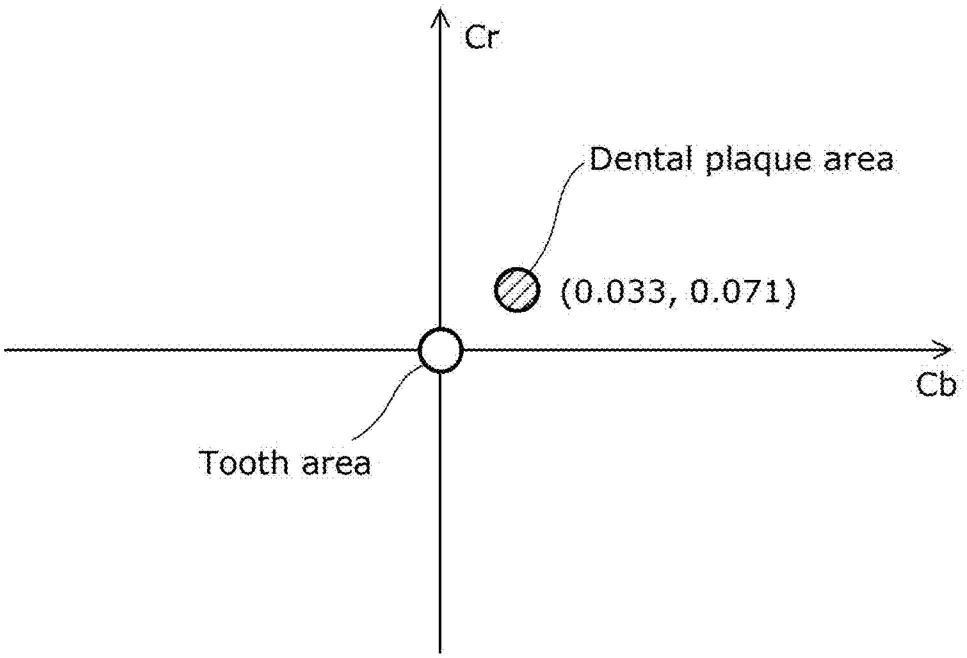
FIG. 7B illustrates an example of color difference data on a dental plaque area and a tooth area obtained through performing exposure control processing and white balance adjustment processing for an image captured while illuminating the teeth with the light including the blue-light wavelength range without the blue-light blocking filter.

FIG. 7B illustrates an example of color difference data on a dental plaque area and a tooth area obtained through performing the exposure control processing and the white balance adjustment processing for an image captured while illuminating the teeth with light including the blue-light wavelength range without the blue-light blocking filter. The tooth area is deemed substantially white. For reference, in FIG. 7B, the color difference average coordinates in hue of the dental plaque area is (0.033, 0.071). It should be noted that the above-mentioned color difference average coordinates in hue are reference values and values that can be changed due to the effects of the intensity of the blue light and the sensitivity of the camera.

Figure 7C:
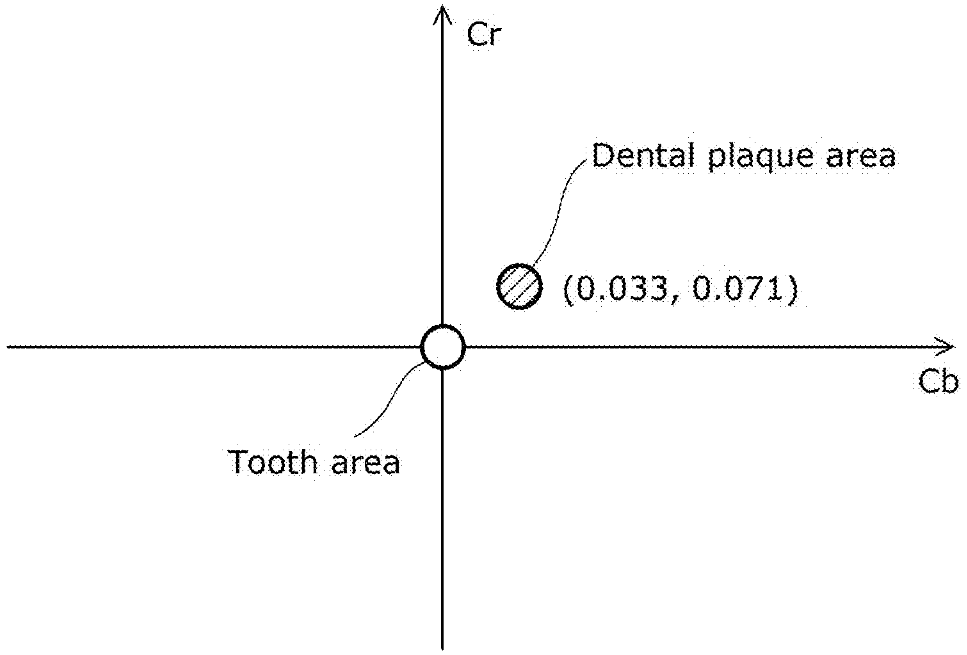
FIG. 7C illustrates an example of color difference data on the dental plaque area and the tooth area obtained through performing the exposure control processing and the white balance adjustment processing for an image captured while illuminating the teeth with the light including the blue-light wavelength range, using the blue-light blocking filter.

Likewise, FIG. 7C illustrates an example of color difference data on the dental plaque area and the tooth area obtained through performing the exposure control processing and the white balance adjustment processing for an image captured while illuminating the teeth with the light including the blue-light wavelength range, using the blue-light blocking filter. The tooth area is deemed substantially white. For reference, in FIG. 6C, the color difference average coordinates in hue of the dental plaque area is (0.033, 0.071). It should be noted that the above-mentioned color difference average coordinates in hue are reference values and values that can be changed due to the effects of the intensity of the blue light and the sensitivity of the camera.

Figure 7D:
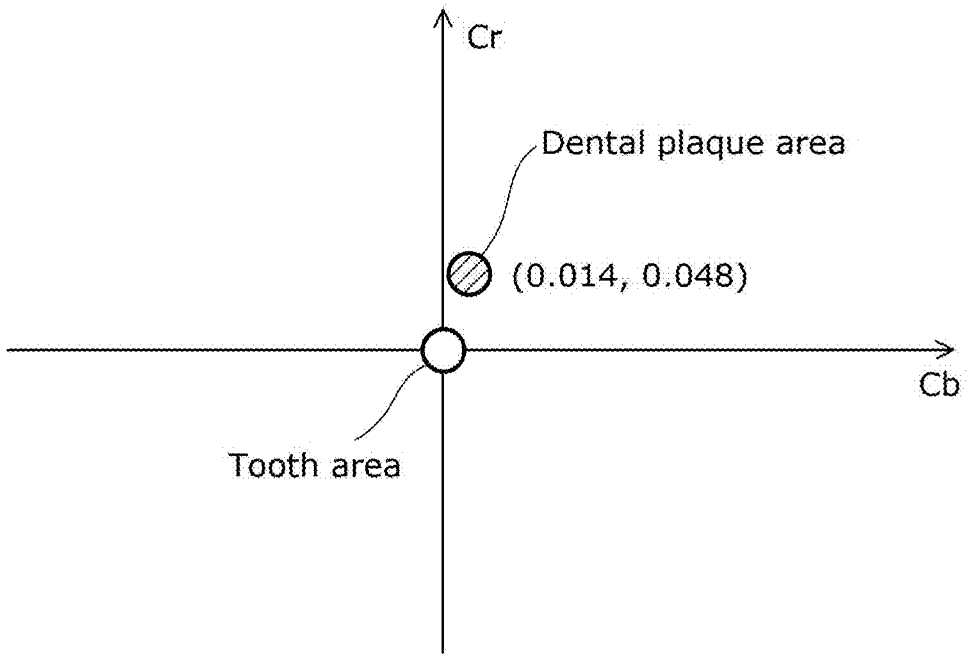
FIG. 7D illustrates an example of color difference data on the dental plaque area and the tooth area obtained through performing the exposure control processing and the white balance adjustment processing for an image captured while illuminating the teeth with the light including the blue-light wavelength range and the white light without the blue-light blocking filter.

Likewise, FIG. 7D illustrates an example of color difference data on the dental plaque area and the tooth area obtained through performing the exposure control processing and the white balance adjustment processing for an image captured while illuminating the teeth with the light including the blue-light wavelength range and the white light without the blue-light blocking filter. The tooth area is deemed substantially white. For reference, in FIG. 6D, the color difference average coordinates in hue of the dental plaque area is (0.014, 0.048). It should be noted that the above-mentioned color difference average coordinates in hue are reference values and values that can be changed due to the effects of the intensity of each of the blue light and the white light and the sensitivity of the camera.

In FIGS. 7B to 7D, it is possible to display the hue of the dental plaque area in almost the same pink color tinged with red regardless of the types of light sources that illuminate the interior of the mouth.

(Display Emphasized Dental Plaque Area)

Figure 8:
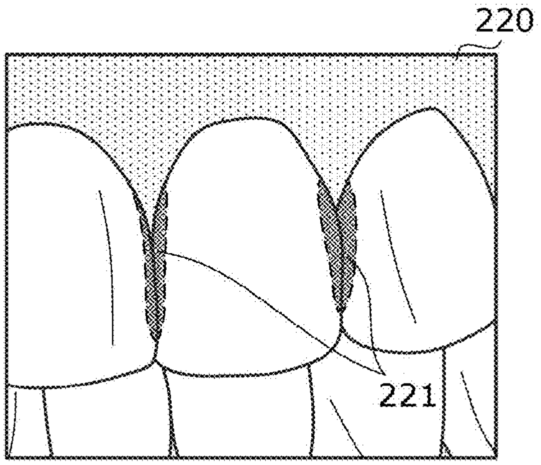
FIG. 8 illustrates an example of a fourth RGB image of the anterior teeth captured in the state illustrated in FIG. 5.
Figure 9:
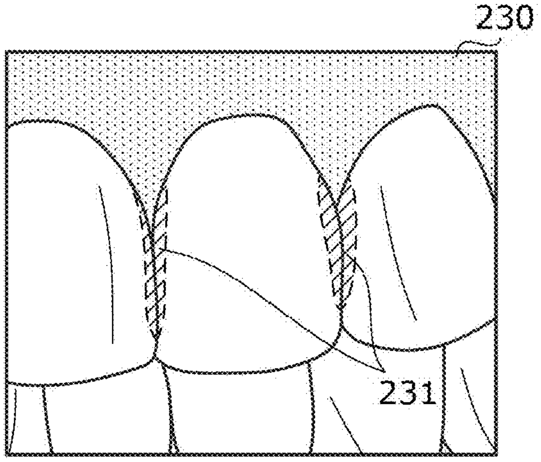
FIG. 9 illustrates another example of the fourth RGB image of the anterior teeth captured in the state illustrated in FIG. 5.

FIG. 8 illustrates an example of a fourth RGB image of the anterior teeth captured in the state illustrated in FIG. 5. FIG. 9 illustrates another example of the fourth RGB image of the anterior teeth captured in the state illustrated in FIG. 5.

As illustrated in FIG. 6A, portable terminal 70 obtains first RGB image 200 from intraoral camera 10.

In addition, portable terminal 70 can generate fourth RGB image 220 in which dental plaque area 221 is distinguishable as illustrated in FIG. 8, by further performing the saturation enhancement processing for dental plaque area 211 in second RGB image 210.

Meanwhile, portable terminal 70 can generate fourth RGB image 230 in which dental plaque area 231 is replaced with a predetermined pattern as illustrated in FIG. 9, by further replacing dental plaque area 211 in second RGB image 210 with the predetermined pattern.

(Procedure of Image Processing)

Figure 10:
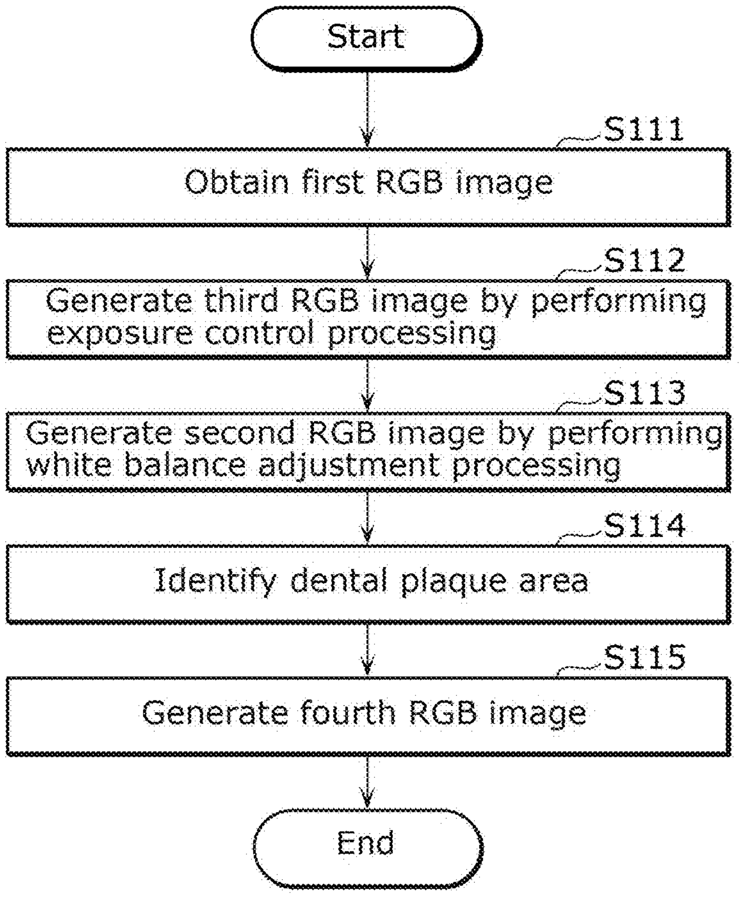
FIG. 10 is a flowchart illustrating image processing in the portable terminal.

FIG. 10 is a flowchart illustrating image processing in portable terminal 70.

Portable terminal 70 obtains a first RGB image from intraoral camera 10 (S111).

Next, portable terminal 70 generates a third RGB image by performing the exposure control processing for the first RGB image (S112).

Then, portable terminal 70 generates a second RGB image by performing the white balance adjustment processing for the third RGB image (S113).

Then, portable terminal 70 identifies a dental plaque area in the second RGB image (S114).

Then, portable terminal 70 generates a fourth RGB image by performing the saturation enhancement processing for the dental plaque area in the second RGB image or by replacing the dental plaque area with the predetermined pattern (S115).

As described above, the image processing device (e.g., portable terminal 70) according to the embodiment includes obtainer 101 and generator 102. Obtainer 101 obtains the first RGB image generated by capturing an image of a tooth fluorescing in response to exposure to light including the blue-light wavelength range. Generator 102 generates a second RGB image by performing, for the first RGB image, the image processing including the first image processing. In the first image processing, a gain for each of at least two color components among the red component, the green component, and the blue component of an RGB image to be processed is adjusted so as to equalize the first red pixel average value of red pixel values, the first green pixel average value of green pixel values, and the first blue pixel average value of blue pixel values, the red pixel values, the green pixel values, and the blue pixel values being pixel values of a plurality of first pixels making up a portion of the RGB image to be processed that corresponds to the tooth.

Thus, by performing the first image processing, it is possible to adjust the white balance of the first RGB image of the fluorescing tooth. In this way, it is possible to generate the second RGB image in which a dental plaque area having dental plaque on the tooth is distinguishable. Thus, it is possible to readily identify the dental plaque area in the tooth image. As such, for instance, by capturing an image of a brushed tooth and identifying dental plaque area(s), it is possible to present the insufficient brushing area(s) to the user.

In the image processing device (e.g., portable terminal 70) according to the embodiment, a fourth RGB image is further generated by: generating an HSV image by converting the color space of the second RGB image into an HSV space; identifying a specific pixel area in which one or more fourth pixels among a plurality of fourth pixels of the HSV image are located, the one or more fourth pixels satisfying at least one of the following: the saturation is within a first predetermined range, the hue is within a second predetermined range, and the value is within a third predetermined range; and performing saturation enhancement processing for the specific pixel area in the second RGB image.

Thus, the specific pixel area as the dental plaque area is identified from the second RGB image, and the saturation enhancement processing is performed for the specific pixel area, which enables generation of the third RGB image in which the dental plaque area is more distinguishable. Accordingly, it is possible to readily identify the dental plaque area in the tooth image.

In the image processing device (e.g., portable terminal 70) according to the embodiment, a fourth RGB image is further generated by: generating an HSV image by converting the color space of the second RGB image into an HSV space; identifying a specific pixel area in which one or more fourth pixels among a plurality of fourth pixels of the HSV image are located, the one or more fourth pixels satisfying at least one of the following: the saturation is within a first predetermined range, the hue is within a second predetermined range, and the value is within a third predetermined range; and replacing the specific pixel area in the second RGB image with a predetermined pattern.

Thus, the specific pixel area as the dental plaque area is identified from the second RGB image, and the specific pixel area is replaced with the predetermined pattern, which enables generation of the fourth RGB image in which the dental plaque area is more distinguishable. Accordingly, it is possible to readily identify the dental plaque area in the tooth image.

In the image processing device (e.g., portable terminal 70) according to the embodiment, the image processing further includes the second image processing. In the second image processing, a third RGB image is generated by determining a gain for setting the average value of index values calculated from the second-pixel values of a plurality of second pixels included in an RGB image to be processed, to a predetermined value, and applying the gain determined to the RGB image to be processed. In the first image processing, the third RGB image is processed.

Since the exposure control processing is performed by adjusting the gain for the luminance values of the plurality of second pixels, conditions for the luminance values can be made constant even if there are variations in the image capturing conditions. Since luminance distribution conditions for the third RGB image for which the first image processing is to be performed can be made constant regardless of the image capturing conditions, the first image processing can be performed more effectively.

In the image processing device (e.g., portable terminal 70) according to the embodiment, the average value of the luminance values is the average value of a color component having the largest average value among the red component, the green component, and the blue component of the first RGB image.

In the image processing device (e.g., portable terminal 70) according to the embodiment, the luminance values are obtained based on the red pixel value, the green pixel value, and the blue pixel value included in each of pixel values.

In the image processing device (e.g., portable terminal 70) according to the embodiment, the plurality of second pixels are pixels, among a plurality of third pixels making up the first RGB image, that satisfy the following: the largest pixel value among the pixel value among the pixel value of a red component, the pixel value of a green component, and the pixel value of a blue component is lower than a first threshold, and the smallest pixel value among the pixel values among the pixel value of the red component, the pixel value of the green component, and the pixel value of the blue component is lower than or equal to a second threshold.

Thus, the second image processing can be performed for the first RGB image except for the area strongly affected by reflection of illumination light.

Variations of the embodiment are described below.

[Variation 1]

In the embodiment, generator 102 performs the exposure control processing for the first RGB image and the white balance adjustment processing for the third RGB image generated through the exposure control processing. However, without being limited to the above example, generator 102 need not perform the exposure control processing. For instance, as long as a first RGB image in which the occurrence of variations in the luminance distribution is decreased is obtained, the exposure control processing need not be performed. For instance, by performing illumination control so as to make image capturing conditions constant, the variations in the luminance distribution of the obtained first RGB image may be decreased.

[Variation 2]

In the embodiment, when the user is capturing an image of the interior of their mouth with intraoral camera 10, guidance specifying the intraoral position that is the position of an intraoral area whose image is to be captured may be displayed on display 103 of portable terminal 70. The guidance may be output by sound from the speaker (not illustrated) of portable terminal 70. This enables the user to move intraoral camera 10 closer to the specified intraoral position in accordance with the guidance in order to capture an image of the intraoral area positioned at the specified intraoral position. For instance, examples of the intraoral position include the position of an anterior tooth and the position of a molar.

Then, portable terminal 70 may store, in association with the intraoral position specified by the guidance, the second RGB image or the fourth RGB image generated by performing the image processing for the first RGB image obtained during the provision of the guidance specifying the above-mentioned intraoral position.

Thus, it is possible to readily identify the intraoral position of a tooth included in the second RGB image or the fourth RGB image.

[Variation 3]

In the embodiment, intraoral camera 10 transmits the first RGB image to portable terminal 70, which then performs the image processing for the first RGB image. However, this is just an example. The first RGB image may be transmitted to cloud server 80, which then performs the image processing for the first RGB image and transmits, to portable terminal 70, the second RGB image or the fourth RGB image obtained through the image processing. In this case, the first RGB image may be transmitted from intraoral camera 10 to cloud server 80 without via portable terminal 70 or may be transmitted from intraoral camera 10 to cloud server 80 via portable terminal 70.

[Variation 4]

In the embodiment, in the white balance adjustment processing (the first image processing), the tooth area in the RGB image to be processed is extracted, and a gain for each of at least two color components among the red component, the green component, and the blue component of the RGB image to be processed is adjusted so as to equalize the first red pixel average value, the first green pixel average value, and the first blue pixel average value in the tooth area. However, this is just an example. The pixel average value of each color used as a target to adjust the gain is not limited to an average value in the tooth area and may be an average value in a natural-tooth area.

Figure 11:
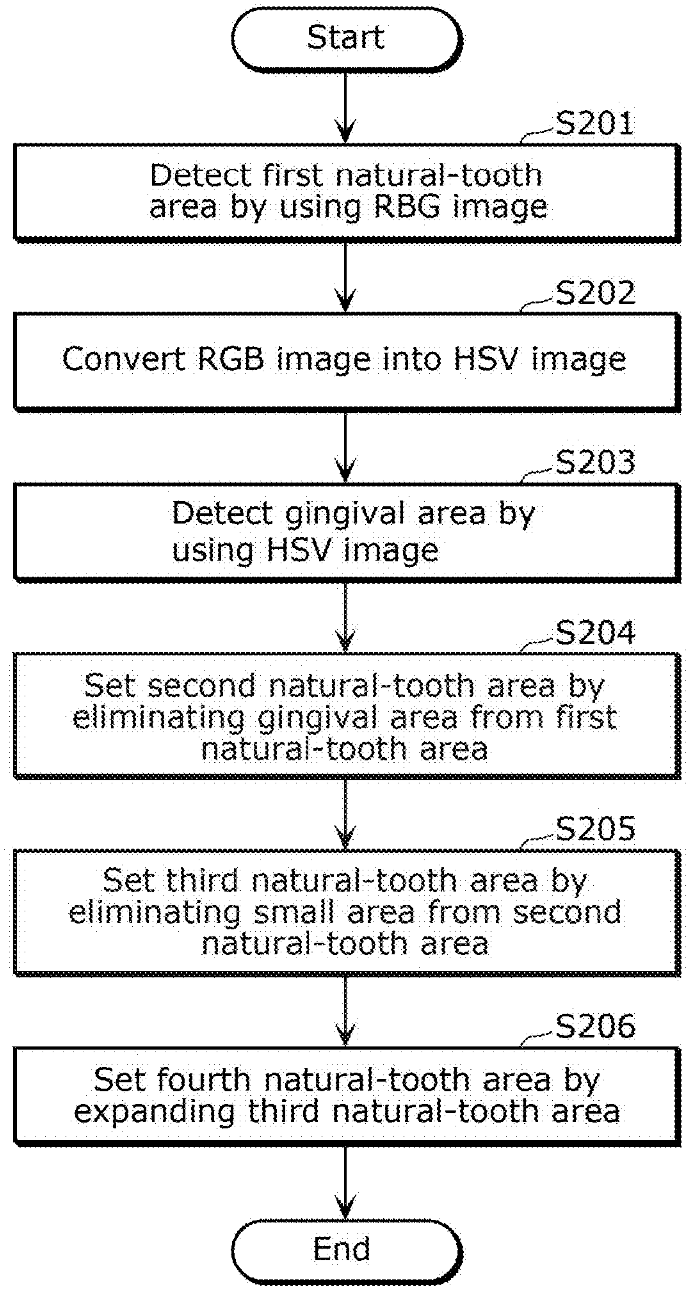
FIG. 11 is a flowchart illustrating the details of processing for detecting a natural-tooth area.

Processing for detecting a natural-tooth area is described below with reference to FIGS. 11 to 15. FIG. 11 is a flowchart illustrating the details of processing for detecting a natural-tooth area.

Figure 12:
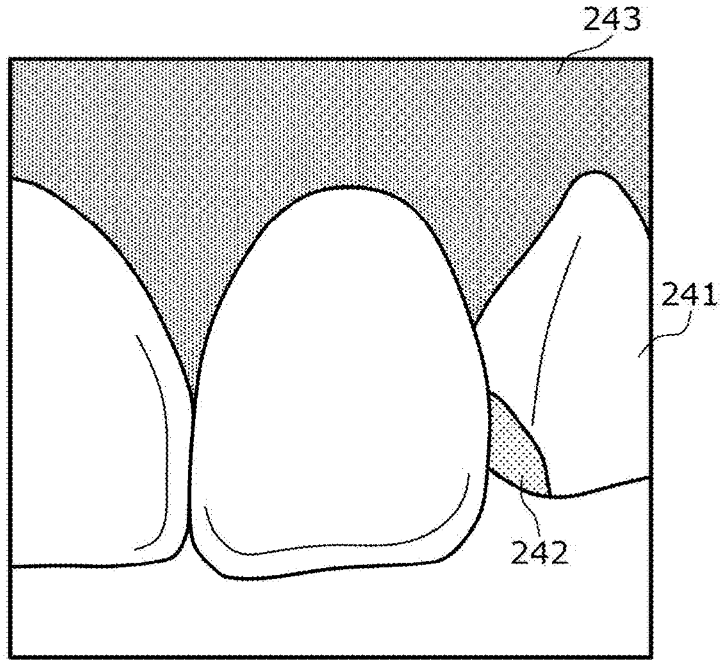
FIG. 12 illustrates an example of an RGB image (the first RGB image).

FIG. 12 illustrates an example of an RGB image (first RGB image). The RGB image illustrated in FIG. 12 is an image of natural tooth 241, artificial tooth 242, and gingiva 243 (gums). Artificial tooth 242 is, for example, a prosthesis made of a metal such as gold or silver. Natural tooth 241 is a natural tooth and the portion of a tooth that does not include artificial tooth 242.

Generator 102 first detects a first natural-tooth area by using an RGB image (first RGB image) (S201). Specifically, in the RGB image, generator 102 detects, as the first natural-tooth area, an area satisfying both of a first condition and a second condition. The first condition is that a green pixel value (G) is greater than or equal to a first threshold. The second condition is that each difference between the green pixel value (G), a red pixel value (R), and a blue pixel value (B) is lower than a third threshold.

Here, when the natural tooth is illuminated with excitation light (blue light), the dentine of the tooth emits excitation fluorescence. The excitation fluorescence transmits through the enamel. Thus, the natural tooth fluoresces green. In addition, a filling used to repair a carious tooth, when illuminated with blue light, appears dark (has a low luminance) in an image captured by a camera, unlike when the filling is illuminated with white light. Meanwhile, the natural tooth covered with enamel is bright (has a high luminance) in the image. Thus, by extracting the green fluorescence using the first condition, it is possible to identify the natural-tooth area and eliminate the artificial-tooth area.

As described above, an artificial tooth such as a prosthesis has a low luminance, which means that the red pixel value, the green pixel value, and the blue pixel value are small in the artificial-tooth area in the RGB image. Thus, to cause the levels of the red pixel value and the blue pixel value to match the level of the green pixel value, when the white balance gains by which the red pixel value and the blue pixel value are to be multiplied are set to AR and AB, respectively, $$AR=G/R$$

$$AB=G/B.$$

Since the red pixel value, the green pixel value, and the blue pixel value are small in the artificial-tooth area, variations in the gains become large when data values vary, which leads to a large hue change in the natural tooth, which is a high-luminance portion. That is, the natural tooth supposed to be displayed in white will have a large amount of change toward red or blue. For this reason, the white balance can be adjusted more properly by extracting, as the tooth area, the natural-tooth area not including the artificial-tooth area and performing the white balance adjustment processing.

In addition, specifically, the second condition includes: (1) the absolute value (abs(R−G)) of the difference between the red pixel value (R) and the green pixel value (G) is lower than threshold rg_th, (2) the absolute value (abs(G−B)) of the difference between the green pixel value (G) and the blue pixel value (B) is lower than threshold gb_th, and (3) the absolute value (abs(B−R)) of the difference between the blue pixel value (B) and the red pixel value (R) is lower than threshold gb_th. It should be noted that threshold rg_th, threshold gb_th, and threshold br_th may be the same value or different values.

In addition, in the first condition, a luminance value (Y) may be used instead of the green pixel value (G). The luminance value (Y) is calculated using the above Expression 3.

As illustrated in Expression 3, since the green pixel value accounts for a large proportion of the luminance value, even if the luminance value is used, detection can be performed in a similar manner as when the green pixel value is used.

It should be noted that for the case described here, both the first condition and the second condition are used. However, only one of the first condition or the second condition may be used. For instance, only the first condition may be used.

Figure 13:
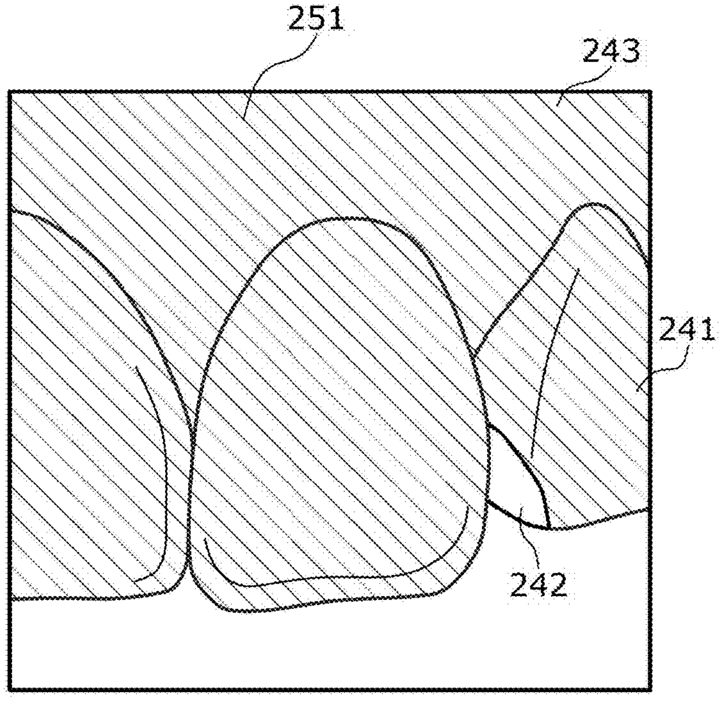
FIG. 13 illustrates an example of a detected first natural-tooth area.

FIG. 13 illustrates an example of detected first natural-tooth area 251. It should be noted that FIG. 13 illustrates the shapes of the teeth and the gingiva in addition to first natural-tooth area 251 for explanation, detected information need not include the shapes of the teeth and the gingiva. This applies to FIGS. 14 and 15.

As illustrated in FIG. 13, the area including the area corresponding to natural tooth 241 and the area corresponding to gingiva 243 is detected as first natural-tooth area 251. That is, first natural-tooth area 251 does not include the area corresponding to artificial tooth 242.

It should be noted that in the example described here, first natural-tooth area 251 includes the entirety of the area corresponding to gingiva 243. However, according to the image capturing situation, a case in which first natural-tooth area 251 includes only a portion of the area corresponding to gingiva 243 and a case in which first natural-tooth area 251 does not include the area corresponding to gingiva 243 may occur.

Next, generator 102 generates an HSV image by converting the color space of the RGB image (first RGB image) into an HSV space (S202). Then, generator 102 detects the gingival area by using the HSV image (S203). Specifically, generator 102 detects, as the gingival area, the area in which the hue (H) is within a predetermined range.

Figure 14:
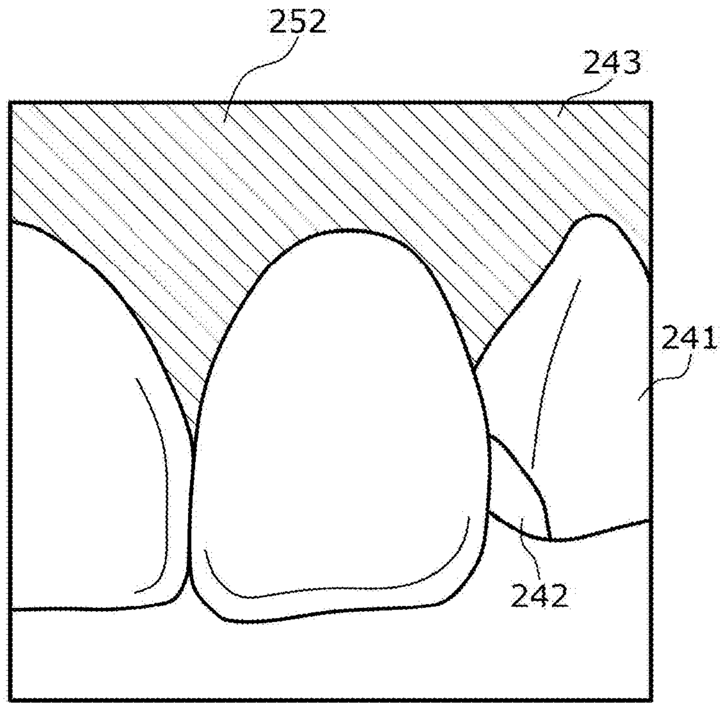
FIG. 14 illustrates an example of a detected gingival area.

FIG. 14 illustrates an example of detected gingival area 252. As illustrated in FIG. 14, the area corresponding to gingiva 243 is detected as gingival area 252. It should be noted that an example of detecting the area corresponding to the gums is described here. However, for example, lips as well as the gums may be detected as gingival area 252.

Figure 15:
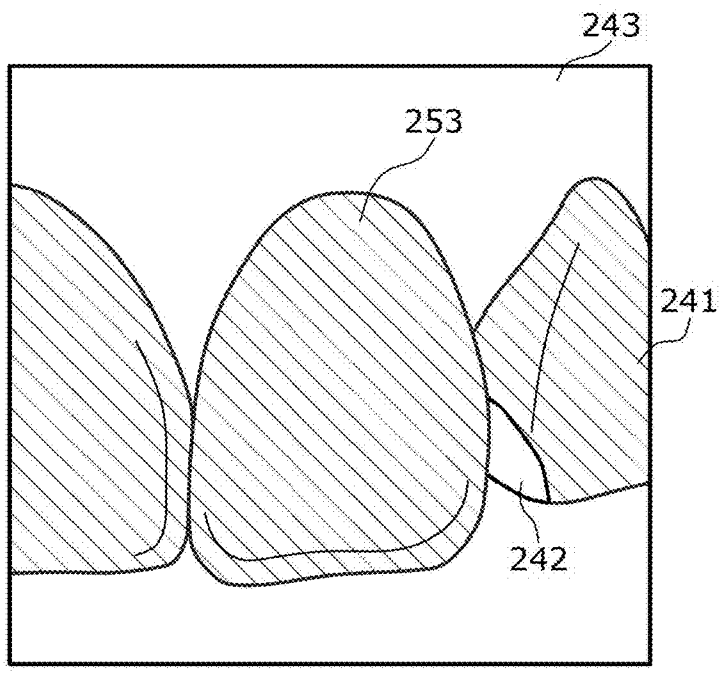
FIG. 15 illustrates an example of a detected second natural-tooth area.

Then, generator 102 determines, as second natural-tooth area 253, the area obtained by eliminating gingival area 252 from first natural-tooth area 251 (S204). FIG. 15 illustrates an example of second natural-tooth area 253. As illustrated in FIG. 15, second natural-tooth area 253 includes the area corresponding to natural tooth 241 and does not include the areas corresponding to artificial tooth 242 and gingiva 243.

Then, generator 102 sets a third natural-tooth area by eliminating a small area from second natural-tooth area 253 (S205). Here, the small area has an area (size) smaller than a predetermined value, for example. Thus, it is possible to suppress the occurrence of the case in which an area having a high luminance attributed to, for example, reflection light in an area (e.g., gingival area) other than the natural-tooth area is determined as a natural-tooth area by mistake.

Then, generator 102 sets a fourth natural-tooth area by expanding the third natural-tooth area (S206). Specifically, an area obtained by moving the boundary of the third natural-tooth area outward by a predetermined amount is set to the fourth natural-tooth area by generator 102. Thus, for example, the boundary between the teeth and the gums can be added to the natural-tooth area, which can suppress excessive avoidance of displaying a dental plaque area.

Generator 102 finally detects the fourth natural-tooth area as a natural-tooth area to be used in the white balance adjustment processing.

[Variation 5]

In the embodiment, the image data obtained by intraoral camera 10 is an RGB image. However, the image data may be a CMYG image obtained by a CMYG complementary color filter that consists of four colors: cyan, magenta, yellow and green. The CMYG image may be converted into an RGB image by performing an operation using an approximate expression, and portable terminal 70 may perform the image processing for the RGB image obtained through the conversion. The conversion from the CMYG image into the RGB image may be performed by intraoral camera 10, portable terminal 70, or another information processing device.

For instance, operation expressions as described below (Expressions 5 to 9) can be used as a method of calculating each value of RGB from each value of CMYG.

$$Mg \approx R+B \quad \text{(Expression 5)}$$

$$Ye \approx R+G \quad \text{(Expression 6)}$$

$$Cy \approx G+B \quad \text{(Expression 7)}$$

$$(Mg+Ye-Cy)/2 \approx \{(R+B)+(R+G)-(G+B)\}/2 = R \quad \text{(Expression 8)}$$

$$(Mg+Cy-Ye)/2 \approx \{(R+B)+(G+B)-(R+G)\}/2 = B \quad \text{(Expression 9)}$$

Here, Mg denotes magenta, Ye denotes yellow, and Cy denotes cyan.

The intraoral camera system according to the embodiment of the present disclosure is described above. However, the present disclosure is not limited to the embodiment.

For instance, in the examples described above, intraoral camera 10 mainly used to capture an image of a tooth is used. However, intraoral camera 10 may be an intraoral-care device including a camera. For instance, intraoral camera 10 may be, for example, a dental washer including a camera.

In addition, the processing units included in the intraoral camera system according to the embodiment are typically embodied as LSIs, which are integrated circuits. The processing units may be made as individual chips. Some or all of the processing units may be incorporated into one chip.

In addition, circuit integration may be achieved not only as an LSI but also as a dedicated circuit or a general-purpose processor. A field programmable gate array (FPGA), which can be programmed after manufacturing, or a reconfigurable processor in which the connections and settings of circuit cells inside an LSI are reconfigurable may be used.

In addition, in the embodiment, each of the structural elements may be dedicated hardware or may be achieved by executing a software program suitable for the structural element. The structural element may be achieved by a program executer, such as a CPU or a processor, reading and executing a software program stored in a recording medium, such as a hard disk or semiconductor memory.

In addition, the present disclosure may be embodied as, for example, an image display method to be performed by the intraoral camera system. In addition, the present disclosure may be embodied as the intraoral camera, the portable terminal, or the cloud server included in the intraoral camera system.

In addition, the functional block configuration illustrated in each block diagram is a mere example. Two or more functional blocks may be incorporated into one functional block. One functional block may be divided into more than one functional block. A part of the function may be transferred from one functional block to another functional block. In addition, the same hardware or software may process the functions of two or more functional blocks having similar functions in parallel or on a time-sharing basis.

In addition, the order in which the steps are performed in each flowchart is provided as an example to specifically explain the present disclosure. The steps may be performed in a different order. In addition, one or more of the steps may be performed simultaneously (in parallel) with another step.

The intraoral camera system(s) according to one aspect or aspects are described above on the basis of the embodiment. However, the present disclosure is not limited to the embodiment. Within the scope of the present disclosure, the one aspect or the aspects may include one or more embodiments obtained by making various changes envisioned by those skilled in the art to each embodiment and one or more embodiments obtained by combining structural elements described in the different embodiments.

INDUSTRIAL APPLICABILITY

The present disclosure is applicable to an intraoral camera system.

The invention claimed is:

1. An image processing method comprising:

obtaining a first Red, Green and Blue (RGB) image generated by capturing an image of a tooth and dental plaque that are fluorescing in response to exposure to light including a blue-light wavelength range; and generating a second RGB image by performing, for the first RGB image, image processing including first image processing, wherein in the first image processing, a tooth area in an RGB image to be processed is identified, and a gain for each of at least two color components among a red component, a green component, and a blue component of the RGB image to be processed is adjusted so as to equalize a first red pixel average value of red pixel values, a first green pixel average value of green pixel values, and a first blue pixel average value of blue pixel values, the red pixel values, the green pixel values, and the blue pixel values being pixel values of a plurality of first pixels included in the identified tooth area.

2. The image processing method according to claim 1, wherein in the first image processing, the gain for each of the at least two color components among the red component, the green component, and the blue component of the RGB image to be processed is adjusted so as to equalize a first red pixel average value of red pixel values, a first green pixel average value of green pixel values, and a first blue pixel average value of blue pixel values, the red pixel values, the green pixel values, and the blue pixel values being pixel values of a plurality of first pixels included in the identified tooth area, the identified tooth area being a natural-tooth area.

3. The image processing method according to claim 1, further comprising:

generating a fourth RGB image by:

generating an Hue, Saturation, Value (HSV) image by converting a color space of the second RGB image into an HSV space;

identifying a specific pixel area in which one or more fourth pixels among a plurality of fourth pixels of the HSV image are located, the one or more fourth pixels satisfying at least one of the following: a saturation is within a first predetermined range, a hue is within a second predetermined range, and a value is within a third predetermined range; and performing saturation enhancement processing for the specific pixel area in the second RGB image.

4. The image processing method according to claim 1, further comprising:

generating a fourth RGB image by:

generating an Hue, Saturation, Value (HSV) image by converting a color space of the second RGB image into an HSV space;

identifying a specific pixel area in which one or more fourth pixels among a plurality of fourth pixels of the HSV image are located, the one or more fourth pixels satisfying at least one of the following: a saturation is within a first predetermined range, a hue is within a second predetermined range, and a value is within a third predetermined range; and replacing the specific pixel area in the second RGB image with a predetermined pattern.

5. The image processing method according to claim 1, wherein the image processing further includes second image processing, in the second image processing, a third RGB image is generated by determining a gain for setting an average value of index values calculated from second-pixel values of a plurality of second pixels included in an RGB image to be processed, to a predetermined value, and applying the gain determined to the RGB image to be processed, and in the first image processing, the third RGB image is processed.

6. The image processing method according to claim 5, wherein the average value of the index values is an average value of a color component having a largest average value among a red component, a green component, and a blue component of the first RGB image.

7. The image processing method according to claim 5, wherein the index values are obtained based on a red pixel value, a green pixel value, and a blue pixel value included in each of the second-pixel values.

8. The image processing method according to claim 5, wherein the plurality of second pixels are pixels, among a plurality of third pixels making up the first RGB image, that satisfy both of the following: a largest pixel value among a pixel value of a red component, a pixel value of a green component, and a pixel value of a blue component is lower than a first threshold, and a smallest pixel value among the pixel value of the red component, the pixel value of the green component, and the pixel value of the blue component is lower than or equal to a second threshold.

9. The image processing method according to claim 1, further comprising:

detecting an intraoral position that is a position of an intraoral area captured as the first RGB image; and storing the second RGB image in association with the intraoral position.

10. The image processing method according to claim 1, wherein the obtaining of the first RGB image includes:

irradiating the tooth with excitation light including blue light to cause the tooth and the dental plaque to fluoresce; and capturing an image of the tooth and the dental plaque while the tooth and the dental plaque are fluorescing in response to the irradiation, thereby generating the first RGB image.

11. An image processing device comprising:

an obtainer that obtains a first Red, Green and Blue (RGB) image generated by capturing an image of a tooth and dental plaque that are fluorescing in response to exposure to light including a blue-light wavelength range; and a generator that generates a second RGB image by performing, for the first RGB image, image processing including first image processing, wherein in the first image processing, a tooth area in an RGB image to be processed is identified, and a gain for each of at least two color components among a red component, a green component, and a blue component of the RGB image to be processed is adjusted so as to equalize a first red pixel average value of red pixel values, a first green pixel average value of green pixel values, and a first blue pixel average value of blue pixel values, the red pixel values, the green pixel values, and the blue pixel values being pixel values of a plurality of first pixels included in the identified tooth area.

12. The image processing device according to claim 11, wherein in the first image processing, the gain for each of the at least two color components among the red component, the green component, and the blue component of the RGB image to be processed is adjusted so as to equalize a first red pixel average value of red pixel values, a first green pixel average value of green pixel values, and a first blue pixel average value of blue pixel values, the red pixel values, the green pixel values, and the blue pixel values being pixel values of a plurality of first pixels included in the identified tooth area, the identified tooth area being a natural-tooth area.

13. The image processing device according to claim 11, wherein the obtainer is configured to obtain the first RGB image from an intraoral camera configured to:

irradiate the tooth with excitation light including blue light to cause the tooth and the dental plaque to fluoresce; and capture an image of the tooth and the dental plaque while the tooth and the dental plaque are fluorescing in response to the irradiation.

14. A non-transitory computer-readable recording medium for causing a computer to execute the image processing method according to claim 1.

* * * * *